United States Patent
Lee et al.

(10) Patent No.: US 11,990,067 B2
(45) Date of Patent: May 21, 2024

(54) METHOD AND DEVICE TO DISPLAY EXTENDED SCREEN OF MOBILE DEVICE

(71) Applicant: Samsung Electronics Co., Ltd., Suwon-si (KR)

(72) Inventors: Jaeik Lee, Suwon-si (KR); Seonghoon Kang, Suwon-si (KR); Yerin Park, Suwon-si (KR); Doeun Shin, Suwon-si (KR); Hyoin Ahn, Suwon-si (KR); Joayoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/895,518

(22) Filed: Aug. 25, 2022

(65) Prior Publication Data

US 2023/0082748 A1 Mar. 16, 2023

Related U.S. Application Data

(63) Continuation of application No. PCT/KR2022/010076, filed on Jul. 12, 2022.

(30) Foreign Application Priority Data

Sep. 15, 2021 (KR) .................. 10-2021-0123239
Sep. 28, 2021 (KR) .................. 10-2021-0128247

(51) Int. Cl.
*G09G 3/00* (2006.01)
*G02B 27/00* (2006.01)
(Continued)

(52) U.S. Cl.
CPC ......... *G09G 3/002* (2013.01); *G02B 27/0093* (2013.01); *G02B 27/0172* (2013.01);
(Continued)

(58) Field of Classification Search
CPC .......... G09G 3/002; G09G 2340/0464; G09G 2354/00; G09G 2370/06; G09G 2370/16;
(Continued)

(56) References Cited

U.S. PATENT DOCUMENTS 10,001,645 B2  6/2018  Norden
10,168,788 B2  1/2019  Hall et al.
(Continued)

FOREIGN PATENT DOCUMENTS

CN   114371819 A  *  4/2022
JP   2014-174507 A     9/2014
(Continued)

OTHER PUBLICATIONS

International Search Report dated Oct. 7, 2022, issued in International Patent Application No. PCT/KR2022/010076.

*Primary Examiner* — Sahlu Okebato
(74) *Attorney, Agent, or Firm* — Jefferson IP Law, LLP

(57) ABSTRACT

An electronic device is provided. The electronic device includes wireless communication with an external device, that determines a reference display position at which an extended screen of a mobile device is to be provided based on a wireless communication signal of the external device, (Continued)

and when a portion of the extended screen is included in a field of view (FOV), provides a user with the extended screen starting with the portion coming into the FOV.

18 Claims, 20 Drawing Sheets

(51) Int. Cl.
  *G02B 27/01* (2006.01)
  *G06F 3/01* (2006.01)
(52) U.S. Cl.
  CPC ......... *G02B 27/0179* (2013.01); *G06F 3/012* (2013.01); *G02B 2027/014* (2013.01); *G02B 2027/0187* (2013.01); *G09G 2340/0464* (2013.01); *G09G 2354/00* (2013.01); *G09G 2370/06* (2013.01); *G09G 2370/16* (2013.01)
(58) Field of Classification Search
  CPC ............ G02B 27/0093; G02B 27/0172; G02B 27/0179; G02B 2027/014; G02B 2027/0187; G06F 3/012; G06F 1/163; G06F 3/04845; G06F 3/04847; G06F 3/04883; G06F 2200/1614; G06F 2203/04806; G06F 2203/04808; G06F 1/1626; G06F 1/1694; G06F 1/1698; G06F 2203/0384; G06F 3/013; G06F 3/014; G06F 3/017; G06F 3/0346; G06F 3/011
  See application file for complete search history.

(56) References Cited

U.S. PATENT DOCUMENTS

| | | | |
|---|---|---|---|
| 10,379,345 | B2 | 8/2019 | Mullins |
| 2016/0320625 | A1 | 11/2016 | Von Und Zu Liechtenstein |
| 2018/0374269 | A1* | 12/2018 | Smith .................. G06K 7/1413 |
| 2020/0082638 | A1 | 3/2020 | Rober et al. |
| 2022/0365741 | A1* | 11/2022 | Yuki ....................... G06F 3/011 |

FOREIGN PATENT DOCUMENTS

| | | |
|---|---|---|
| KR | 10-2015-0025115 A | 3/2015 |
| KR | 10-2016-0036915 A | 4/2016 |
| KR | 10-1877846 B1 | 7/2018 |
| KR | 10-2182162 B1 | 11/2020 |
| KR | 10-2235902 B1 | 4/2021 |
| WO | 2021/062278 A1 | 4/2021 |

* cited by examiner

METHOD AND DEVICE TO DISPLAY EXTENDED SCREEN OF MOBILE DEVICE

CROSS-REFERENCE TO RELATED APPLICATION(S)

This application is a continuation application, claiming priority under § 365(c), of International Application No. PCT/KR2022/010076, filed on Jul. 12, 2022, which is based on and claims the benefit of a Korean patent application number 10-2021-0123239, filed on Sep. 15, 2021, in the Korean Intellectual Property Office, and of a Korean patent application number 10-2021-0128247, filed on Sep. 28, 2021, in the Korean Intellectual Property Office, the disclosure of each of which is incorporated by reference herein in its entirety.

BACKGROUND

1. Field

The disclosure relates to providing augmented reality (AR) of an extended screen of a mobile device.

2. Description of Related Art

A variety of wearable electronic devices providing an augmented reality (AR) service is being released. The AR service, a service providing a virtual image having additional information by overlapping it with a real-world image currently viewed by a user, may provide the user with a virtual object image including a content associated with a real object identified from the real-world image. The wearable electronic devices providing the AR service may have, for example, a form of a head-mounted display (HMD).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that provides an extended screen of a mobile device based on wireless communication instead of a vision sensor.

Another aspect of the disclosure is to provide an electronic device that provides an extended screen of a mobile device without recognition of planes and markers in a space.

Another aspect of the disclosure is to provide an electronic device that provides an extended screen of a mobile device in an augmented reality (AR) environment without environment and device limitations, using wireless communication.

Additional aspects will be set forth in part in the description which follows and, in part, will be apparent from the description, or may be learned by practice of the presented embodiments.

In accordance with an aspect of the disclosure, an electronic device is provided. The electronic device includes a wireless communication module for wireless communication with an external device, an AR display module configured to output an extended screen of a mobile device, a memory configured to store therein computer-executable instructions, and a processor configured to access the memory and execute the instructions. The instructions, when executed, cause the processor to determine a reference display position in an AR environment at which the extended screen received from the mobile device is to be provided based on wireless communication with the external device, and when at least a portion of the extended screen to be provided at the reference display position is included in a field of view (FOV) area of the AR display module, provide a user with the portion of the extended screen through the AR display module.

In accordance with another aspect of the disclosure, a computer-implemented method is provided. The method includes determining a reference display position at which an extended screen of a mobile device is to be provided in an AR environment based on wireless communication with an external device, and when at least a portion of the extended screen to be provided at the reference display position is included in a FOV area of an AR display module, providing a user with the portion of the extended screen through the AR display module.

According to various embodiments described herein, an electronic device may determine a reference display position with respect to an external device based on wireless communication, thereby reducing real-time computing resources.

According to various embodiments described herein, an electronic device may enable an output in an AR environment even when only a portion of an extended screen is included in a field of view (FOV) without requesting recognition of a visual marker, through wireless communication.

According to various example embodiments described herein, an electronic device may track a change in a relative position between the electronic device and an external device with an average latency time of 50 microseconds (μs) corresponding to a frequency higher than 60 hertz (Hz) to 120 Hz through ultra-wideband (UWB) communication, thereby providing a natural extended screen content without a disconnection.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following detailed description, taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
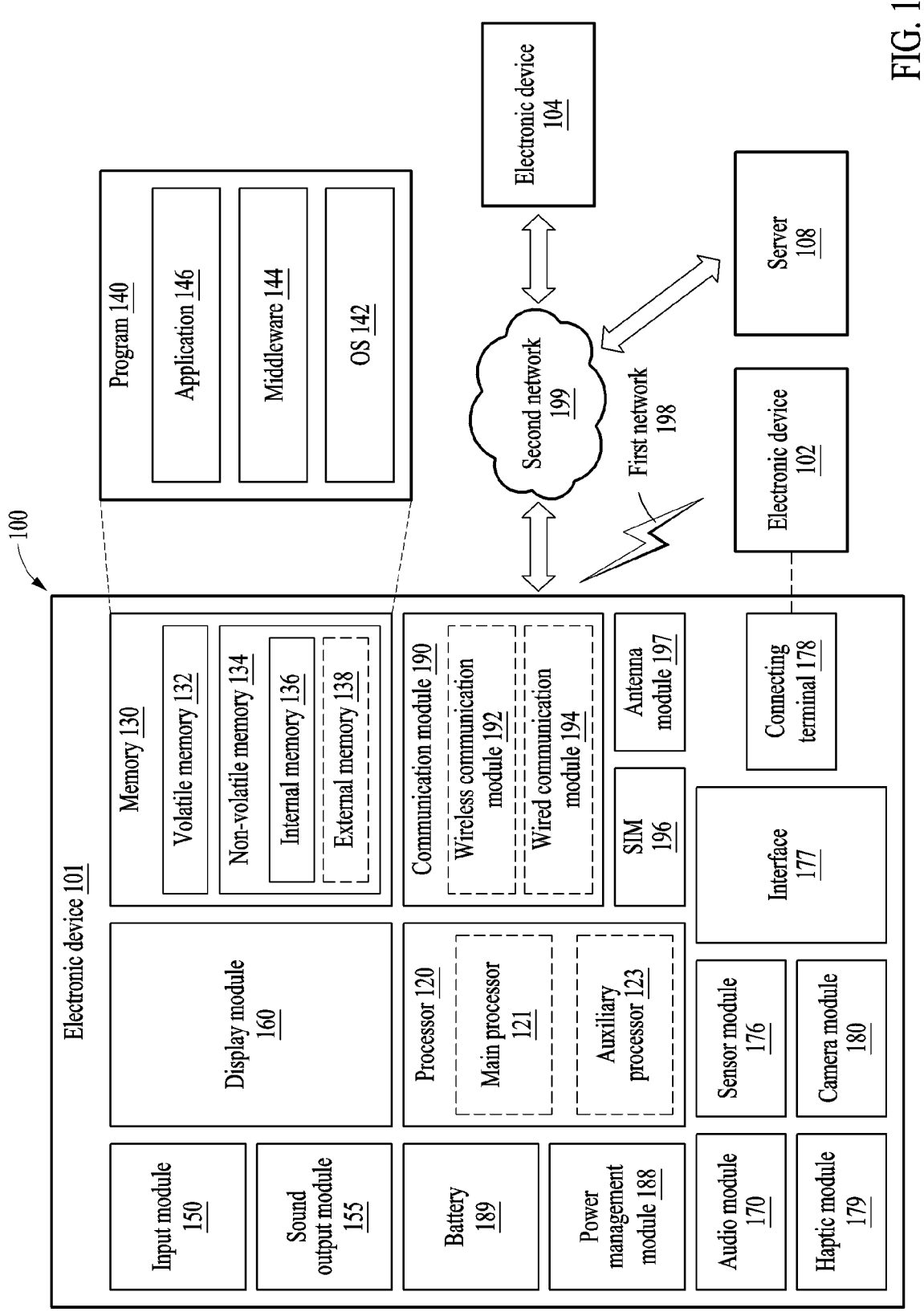
FIG. 1 is a block diagram illustrating an example electronic device in a network environment according to an embodiment of the disclosure.

FIG. 1 is a block diagram illustrating an example electronic device in a network environment according to an embodiment of the disclosure.

Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently of the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., an mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form an mmWave antenna module. According to an example embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. The external electronic device 102 may be a wearable electronic device (e.g., a wearable electronic device 200 of FIG. 2), for example.

According to an example embodiment, all or some of operations to be executed by the electronic device 101 may be executed at one or more of the external electronic devices 102 and 104, or the server 108. For example, if the electronic device 101 needs to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology. The external electronic device 104 is described herein mainly as a wireless communication device having a display module, but examples of which are not limited thereto.

Figure 2:
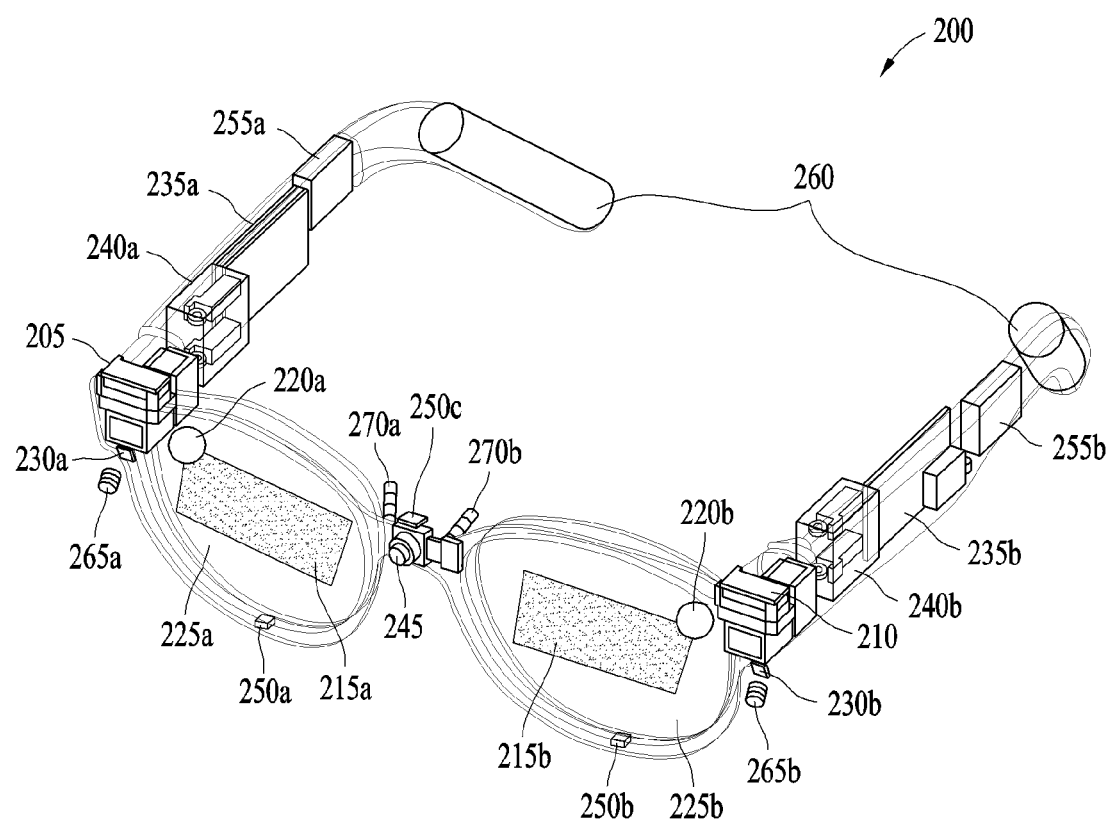
FIG. 2 is a perspective view illustrating a structure of a wearable electronic device according to an embodiment of the disclosure.

FIG. 2 is a perspective view illustrating a structure of a wearable electronic device according to an embodiment of the disclosure.

Referring to FIG. 2, the wearable electronic device 200 (e.g., the electronic device 101 or 102 of FIG. 1) may be worn on a face of a user to provide the user with an image associated with an augmented reality (AR) service and/or a virtual reality (VR) service.

In an embodiment, the wearable electronic device 200 may include a first display 205, a second display 210, screen display portions 215*a* and 215*b*, optical input members 220*a* and 220*b*, a first transparent member 225*a*, a second transparent member 225*b*, lighting units 230*a* and 230*b*, a first printed circuit board (PCB) 235*a*, a second PCB 235*b*, a first hinge 240*a*, a second hinge 240*b*, an imaging camera 245, a plurality of microphones (e.g., a first microphone 250*a*, a second microphone 250*b*, and a third microphone 250*c*), a plurality of speakers (e.g., a first speaker 255*a* and a second speaker 255*b*), a battery 260, a first recognition camera 265*a*, a second recognition camera 265*b*, a first eye detection camera 270*a*, and a second eye detection camera 270*b*.

In an embodiment, an AR display module (e.g., the first display 205 and the second display 210) may include, for example, a liquid crystal display (LCD), a digital mirror device (DMD), or a liquid crystal on silicon (LCoS), an organic light-emitting diode (OLED), a micro light-emitting diode (a micro LED), or the like. Although not illustrated, when a display (e.g., the first display 205 and/or the second display 210) is provided as one of an LCD, a DMD, and an LCoS, the wearable electronic device 200 may include a light source that emits light to a screen output area of the display 205 and/or 210. In another embodiment, when the display 205 and/or 210 is capable of generating light by itself, for example, when the display 205 and/or 210 is either an OLED or a micro-LED, the wearable electronic device 200 may provide a virtual image of a relatively high quality to the user even though a light source is not included. For example, when the display 205 and/or 210 is implemented as an OLED or a micro-LED, such a light source may be unnecessary, and the wearable electronic device 200 may be lightened accordingly. The display 205 and/or 210 capable of generating light by itself may be referred to herein as a "self-luminous display," and the following description will be made on the assumption of the self-luminous display. For example, as to be described below, the AR display module may output an extended screen of a mobile device.

According to various embodiments, the display 205 and/or 210 may include at least one micro-LED. For example, the micro-LED may express red (R), green (G), and blue (B) by emitting light by itself, and a single chip may implement a single pixel (e.g., one of R, G, and B pixels) because the micro-LED is relatively small in size (e.g., 100 μm or less). Accordingly, the display 205 and/or 210 may provide a high resolution without a backlight unit (BLU), when it is implemented by the micro-LED. However, examples are not limited thereto, and a single chip may be implemented by a plurality of pixels including R, G, and B pixels. The display 205 and/or 210 may also be referred to as a "light source."

In an embodiment, the display 205 and/or 210 may include pixels for displaying a virtual image. The display 205 and/or 210 may further include infrared (IR) pixels that emit IR light.

In an embodiment, the display 205 and/or 210 may further include light-receiving pixels (e.g., photo sensor pixels) that are disposed between pixels and configured to receive light reflected from eyes of a user, convert the received light into electrical energy, and output the electrical energy. A light-receiving pixel may also be referred to herein as a "gaze tracking sensor." The gaze tracking sensor may detect IR light generated as light emitted by the IR pixels included in the display 205 and/or 210 is reflected by the eyes of a user.

The wearable electronic device 200 may detect a gaze direction (e.g., a pupil movement) of the user using the light-receiving pixels. For example, the wearable electronic device 200 may detect and track a gaze direction of a right eye of the user and a gaze direction of a left eye of the user through one or more light-receiving pixels of the first display 205 and one or more light-receiving pixels of the second display 210. The wearable electronic device 200 may determine a central position of a virtual image based on the gaze directions (e.g., directions in which pupils of the right eye and the left eye of the user gaze) that are detected through the light-receiving pixels.

The wearable electronic device 200 may include the first display 205 and the second display 210, and the first transparent member 225a and/or the second transparent member 225b. The user may use the wearable electronic device 200 with the wearable electronic device 200 on their face. In an embodiment, the first transparent member 225a may be disposed to face the right eye of the user, and the second transparent member 225b may be disposed to face the left eye of the user. For example, when the display 205 and/or 210 is transparent, they may be disposed to face the eyes of the user to configure the screen display portions 215a and 215b.

The first display 205 and the second display 210 may each include a first control circuit (not shown). The first control circuit may control the first display 205 and the second display 210. The first control circuit may control an operation of a liquid crystal element of a transparent cover (not shown) included in the first display 205 and the second display 210. In an embodiment, light emitted from the display 205 and/or 210 may reach the screen display portion 215a formed on the first transparent member 225a that faces the right eye of the user, and the screen display portion 215b formed on the second transparent member 225b that faces the left eye of the user, by passing through a lens (not shown) and a waveguide.

The lens may be disposed in front of the display 205 and/or 210. The lens may include a concave and/or convex lens. For example, the lens may include a projection lens or a collimation lens.

In an embodiment, the light emitted from the display 205 and/or 210 may be guided by the waveguide through the optical input members 220a and 220b. The light traveling in the waveguide may be guided toward the eyes of the user through an optical output member. The screen display portions 215a and 215b may be determined based on the light emitted toward the eyes of the user.

For example, the light emitted from the display 205 and/or 210 may be reflected from a grating area of the waveguide formed in the optical input members 220a and 220b and the screen display portions 215a and 215b, and may then be transmitted to the eyes of the user.

In an embodiment, the screen display portions 215a and 215b or a transparent member (e.g., the first transparent member 225a and the second transparent member 225b) may include a reflective lens, a lens including the waveguide. The waveguide may function to transmit a light source generated by the display 205 and/or 210 to the eyes of the user, and may be referred to as an "optical waveguide." The optical waveguide or the waveguide may correspond to the screen display portions 215a and 215b.

The screen display portions 215a and 215b may be a path through which external light is incident, totally reflected, and emitted, and may be distinguished from the first transparent member 225a and the second transparent member 225b through which external light is simply reflected or transmitted.

In an embodiment, the screen display portions 215a and 215b may be formed of glass, plastic, or a polymer, and may have a nanopattern formed on one surface of the inside or outside thereof, for example, a grating structure of a polygonal or curved shape. According to an embodiment, light incident on one end of the screen display portions 215a and 215b through the optical input members 220a and 220b may be propagated inside the display optical waveguide by the nanopattern to be provided to the user. For example, the screen display portions 215a and 215b including a freeform prism may provide the incident light to the user through a reflection mirror.

The screen display portions 215a and 215b may include at least one of a reflective element (e.g., a reflection mirror) and at least one diffractive element (e.g., a diffractive optical element (DOE) or a holographic optical element (HOE)). The screen display portions 215a and 215b may guide light emitted from the display 205 and/or 210 to the eyes of the user, using the diffractive element or the reflective element included in the screen display portions 215a and 215b.

According to various embodiments, the diffractive element may include the optical input members 220a and 220b and/or the optical output member. For example, the optical input members 220a and 220b may correspond to an input grating area, and the optical output member may correspond to an output grating area. The input grating area may function as an input end to diffract (or reflect) light output from the display 205 and/or 210 (e.g., a micro LED) to transmit the light to the screen display portions 215a and 215b. The output grating area may function as an outlet to diffract (or reflect), to the eyes of the user, light transmitted to the waveguide.

According to various embodiments, the reflective element may include an optical total reflection element or a total reflection waveguide for total internal reflection (TIR). For example, total reflection or TIR, which is one of methods of inducing light, may form an angle of incidence such that light (e.g., a virtual image) input through the input grating area is completely or almost completely reflected from a portion (e.g., a specific surface) of the screen display portions 215a and 215b, to completely or almost completely transmit the light to the output grating area.

The first transparent member 225a and/or the second transparent member 225b may be formed of, for example, a glass plate, a plastic plate, or a polymer, and may be transparently or translucently formed. According to an embodiment, the first transparent member 225a may be disposed to face the right eye of the user, and the second transparent member 225b may be disposed to face the left eye of the user.

The lighting units 230a and 230b may be used differently according to positions to which the light units 230a and 230b are attached. For example, the lighting units 230a and 230b may be attached around a frame of the wearable electronic device 200. The lighting units 230a and 230b may be used as an auxiliary means for facilitating detection of an eye gaze when pupils are captured using the eye detection camera 270a and/or 270b. The lighting units 230a and 230b may use an IR LED with a visible light wavelength or an IR light wavelength.

Alternatively, the lighting units 230a and 230b may be attached around a hinge (e.g., the first hinge 240a and the second hinge 240b) connecting the frame (e.g., a rim) of the wearable electronic device 200 and a temple portion corresponding to eyeglass temples, or attached around a camera (e.g., the first recognition camera 265a and the second recognition camera 265b) mounted adjacent to a bridge connecting the frame. In this case, the recognition camera 265a and/or 265b may be, for example, global shutter (GS) cameras, but examples of which are not limited thereto.

In this case, when the GS camera is used to capture an image, the lighting units 230a and 230b may be used to supplement a surrounding brightness. For example, the lighting units 230a and 230b may be used in a dark environment or when it is not easy to detect an object to be captured due to a mixture or a reflection of various light sources.

The lighting units 230a and 230b may be omitted according to an embodiment. The lighting units 230a and 230b may be replaced by the IR pixels included in the first display 205 and the second display 210. In another embodiment, the lighting units 230a and 230b may be included in the wearable electronic device 200 to assist the IR pixels included in the first display 205 and the second display 210.

A PCB (e.g., the first PCB 235a and the second PCB 235b) may be disposed in the temple portion of the wearable electronic device 200, and may transmit an electrical signal to each module (e.g., a camera, a display, an audio, or a sensor) and another PCB through a flexible PCB (FPCB). According to various embodiments, at least one PCB may include the first PCB 235a, the second PCB 235b, and an interposer (not shown) disposed between the first PCB 235a and the second PCB 235b.

In an embodiment, on the PCB (e.g., the first PCB 235a and the second PCB 235b), a control circuit (not shown) configured to control the components of the wearable electronic device 200, excluding the first display 205 and the second display 210, may be disposed. The control circuit may control the components other than the first display 205 and the second display 210 and perform operations such as depth value estimation. The control circuit may include a wireless communication module (e.g., the communication module 190 of FIG. 1) or a memory (e.g., the memory 130 of FIG. 1). The control circuit may control the first display 205, the second display 210, and/or the other components. For example, the wireless communication module may establish wireless communication with another external device (e.g., the electronic device 101 or the electronic device 104 of FIG. 1) in an ultra-wideband (UWB), but a communication band of the wireless communication module is not limited thereto.

The hinges 240a and 240b may correspond to a portion at which the temple and the frame (e.g., the rim) of the wearable electronic device 200 are coupled.

In an embodiment, the imaging camera 245 may be referred to as a "high resolution (HR) camera" or a "photo video (PV) camera," and may include the HR camera. The imaging camera 245 may include a color camera having functions for obtaining a high-quality image, such as an automatic focus (AF) function and an optical image stabilizer (OIS). However, examples of the imaging camera 245 are not limited thereto, and may include a GS camera or a rolling shutter (RS) camera.

In an embodiment, the microphones (e.g., the first microphone 250a, the second microphone 250b, and the third microphone 250c) may convert an external acoustic signal into electrical audio data. The electrical audio data obtained through the processing may be variously utilized according to a function (or an application being executed) being performed by the wearable electronic device 200.

In an embodiment, the speakers (e.g., the first speaker 255a and the second speaker 255b) may output audio data received from a communication circuit (e.g., the communication module 190 of FIG. 1) or stored in a memory (e.g., the memory 130 of FIG. 1).

In an embodiment, the battery 260 may be provided as one or more batteries, and may supply power to the components included in the wearable electronic device 200.

In an embodiment, the first recognition camera 265a and the second recognition camera 265b may include cameras used for three degrees of freedom (3DoF) and six degrees of freedom (6DoF) head tracking, hand detection and tracking, and gesture and/or space recognition. For example, the first recognition camera 265a and the second recognition camera 265b may each include a GS camera to detect and track a movement of a head and a hand. For example, for head tracking and space recognition, two GS cameras of the same specifications and performance may be used because a stereo camera may be used. For detection and tracking of a quick hand movement and a fine finger movement, an RS camera may be used. In an embodiment, the GS camera exhibiting a favorable performance (e.g., image drag) compared to a camera may be mainly used, but the RS camera may also be used according to other various embodiments. The first recognition camera 265a and the second recognition camera 265b may perform functions such as 6DoF space recognition and depth imaging-based simultaneous localization and mapping (SLAM). The first recognition camera 265a and the second recognition camera 265b may also perform a function of recognizing a user gesture.

In an embodiment, at least one sensor (not shown, e.g., a gyro sensor, an acceleration sensor, a geomagnetic sensor, and/or a gesture sensor), the first recognition camera 265a, and the second recognition camera 265b may perform at least one function among 6DoF head tracking, pose estimation and prediction, gesture and/or space recognition, and depth imaging-based SLAM.

In another embodiment, the first recognition camera 265a and the second recognition camera 265b may be classified and used as a camera for head tracking and a camera for hand tracking.

In an embodiment, the first eye detection camera 270a and the second eye detection camera 270b may detect and track pupils. The first eye detection camera 270a and the second eye detection camera 270b may be used to dispose a center of a virtual image projected on the wearable electronic device 200 at a position according to a direction in which the pupils of the user wearing the wearable electronic device 200 gazes. For example, the first eye detection camera 270a and the second eye detection camera 270b may mainly use a GS camera to detect pupils and track a fast movement of the pupils. The first eye detection camera 270a may be installed to correspond to the right eye of the user, and the second eye detection camera 270b may be installed to correspond to the left eye of the user. In this case, the first eye detection camera 270a and the second eye detection camera 270b may have the same camera performance and specifications, but examples of which are not limited thereto.

Figure 3:
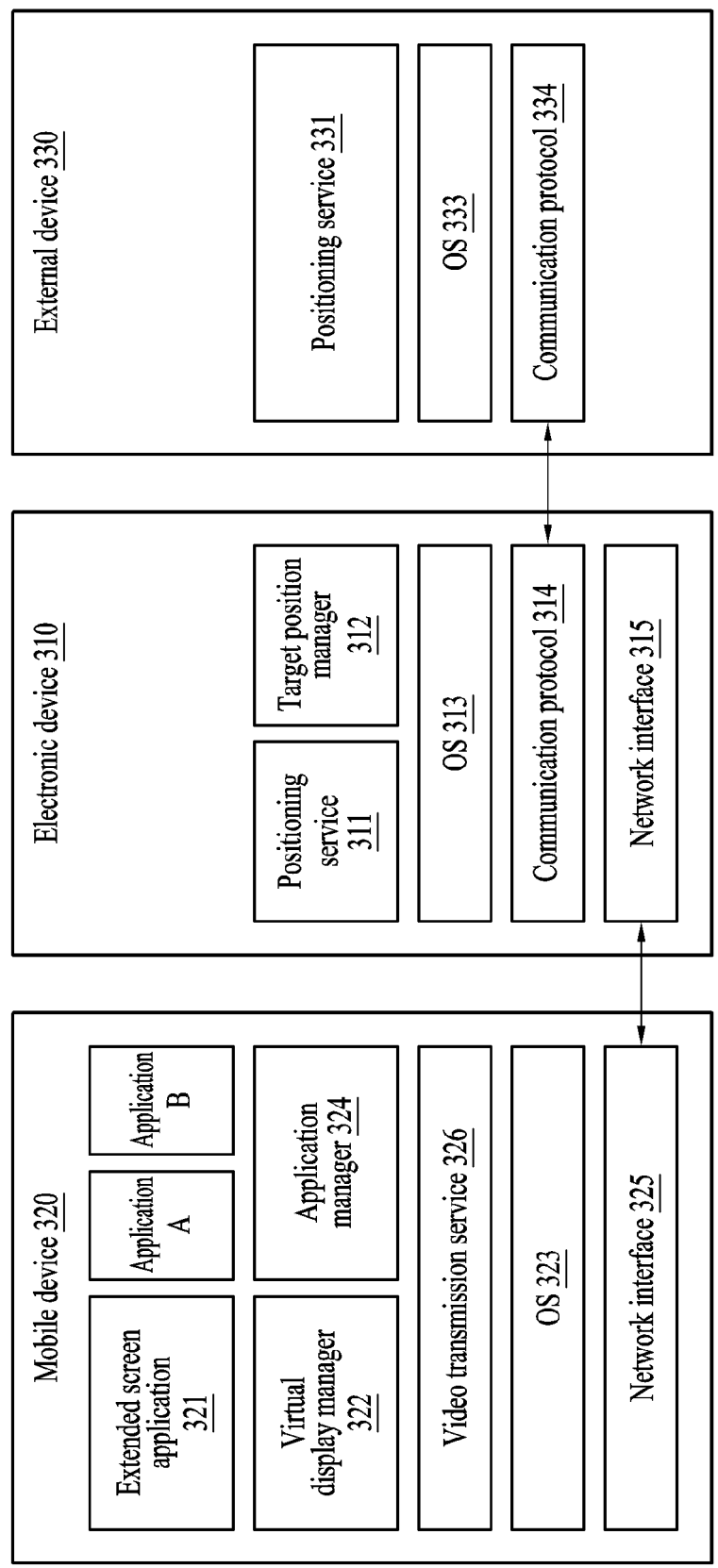
FIG. 3 is a diagram illustrating an example software architecture of an augmented reality (AR) system according to an embodiment of the disclosure.

FIG. 3 is a diagram illustrating an example software architecture of an AR system according to an embodiment of the disclosure.

Referring to FIG. 3, an electronic device 310 may be the wearable electronic device 200 (e.g., the electronic device 102 of FIG. 1). A mobile device 320, a device providing an extended screen, may be the electronic device 101 of FIG. 1. An external device 330 may be a device that establishes communication with the electronic device 310 and provides information associated with a reference display position at which the extended screen is to be provided to the electronic device 310.

A software architecture of the mobile device 320 may include an extended screen application 321, a virtual display manager 322, an operating system (OS) 323, an application manager 324, a network interface 325, and a video transmission service 326.

The extended screen application 321 may display an application being executed on the mobile device 320, an icon, and a notification on a plane corresponding to an extended screen. The extended screen may also be a desktop experience (DeX) screen, for example. The extended screen may be a screen output in another display module that is not its own display module of the mobile device 320, and may be output in an AR environment provided by an AR display module of the electronic device 310. The extended screen may include a graphic representation, an icon, a content, and an application screen of the mobile device 320. For example, the extended screen may have a resolution, an icon arrangement, and a ratio that are different from those of the screen output on the display module of the mobile device 320 itself.

The AR environment, which is a virtual space defined based on the electronic device 310, may be an environment providing an overlap of real-world objects and/or a virtual content rendered on the objects. AR may also be represented as virtual reality (VR) and/or mixed reality (MR).

The virtual display manager 322 may manage the application screen rendered on a memory. For example, the extended screen application 321 may generate a virtual display, and the extended screen may be rendered on the virtual display. A plane (e.g., a plane corresponding to the extended screen) on which the virtual display is to be disposed in the AR environment may cross a gaze direction of a user of the electronic device 310.

The OS 323 may manage the execution and end of each application, manager, and service of the mobile device 320. The application manager 324 may manage a priority of applications (e.g., applications A and B).

The video transmission service 326 may encode image information including a video and the extended screen and transmit the encoded image information to another device through a network. For example, the video transmission service 326 may transmit the extended screen.

The network interface 325 may manage data communication with another device through a wireless communication module (e.g., a UWB module and a Wi-Fi module).

A software architecture of the electronic device 310 may include a positioning service 311, a target position manager 312, an OS 313, a communication protocol 314, and a network interface 315.

When receiving a wireless communication signal (e.g., a scan signal) from the external device 330, the positioning service 311 may calculate position information and pose information associated with the external device 330 transmitting the wireless communication signal and with the electronic device 310. For example, the position information may include coordinates indicating a position of the external device 330 based on a coordinate system of the electronic device 310. The pose information may include a difference in angle between an orientation of the electronic device 310 and a direction from the external device 330 toward the electronic device 310. The wireless communication signal may be a UWB scan signal transmitted to a UWB, but examples of which are not limited thereto. The orientation of the electronic device 310 may be a direction in which one surface of the electronic device 310 faces and be, for example, a direction perpendicular to the screen plane of the electronic device 310. The orientation of the electronic device 310 may indicate the same direction as a reference vector of the electronic device 310.

The target position manager 312 may calculate and manage the position information for mapping a digital content to a real-world object and/or background in the AR environment and visualizing the mapped digital content.

The OS 313 may manage the execution and end of each application, manager, and service of the electronic device 310. The communication protocol 314 may refer to a protocol for establishing communication with another device. For example, the communication protocol 314 may establish communication with the external device 330 using a UWB protocol. The network interface 315 may perform data communication with a network interface (e.g., the network interface 325) of another device.

A software architecture of the external device 330 may include a positioning service 331, an OS 333, and a communication protocol 334.

When receiving a wireless communication signal (e.g., a scan signal) from the electronic device 310, the positioning service 331 may calculate position information and pose information associated with the external device 330 and the electronic device 310 transmitting the wireless communication signal. The position information may include a difference in height between the external device 330 and the electronic device 310 based on a coordinate system of the electronic device 310. The pose information may include a difference in angle between an orientation of the external device 330 and a direction from the external device 330 toward the electronic device 310.

The OS 333 may manage the execution and end of each application, manager, and service of the external device 330. The communication protocol 334 may refer to a protocol for establishing communication with another device. For example, the communication protocol 334 may establish communication with the electronic device 310 using a UWB protocol.

Although the external device 330 and the mobile device 320 are illustrated separately in FIG. 3, examples of which are not limited thereto. For example, the external device 330 may be the mobile device 320 or a wireless communication device. Hereinafter, the mobile device 320 operating as the external device 330 will be described as an example with reference to FIGS. 5 through 10. In this example, when the external device 330 is the mobile device 320, the mobile device 320 may provide the electronic device 310 with both an extended screen and information associated with a reference display position. Hereinafter, a separate wireless communication device operating as the external device 330 will be described as another example with reference to FIGS. 11 through 15. In this example, when the external device 330 is the wireless communication device, the mobile device 320 may provide an extended screen, and the wireless communication device may provide information associated with a reference display position. The wireless communication device may be an independent device separated from the mobile device 320, and may be the electronic device 104 of FIG. 1 as a main example.

Figure 4:
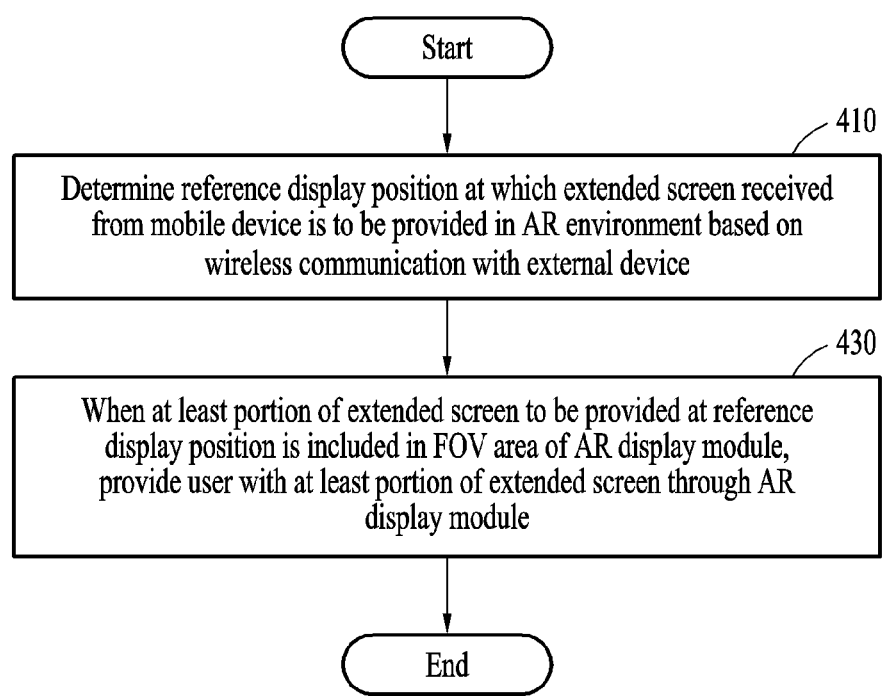
FIG. 4 is a flowchart illustrating an example method of providing an extended screen according to an embodiment of the disclosure.

FIG. 4 is a flowchart illustrating an example method of providing an extended screen according to an embodiment of the disclosure.

Referring to FIG. 4, in operation 410, an electronic device (e.g., the wearable electronic device 200 of FIG. 2 and the electronic device 310 of FIG. 3) may determine a reference display position in an AR environment at which an extended screen received from a mobile device (e.g., the electronic device 101 of FIG. 1 and the mobile device 320 of FIG. 3) is to be provided, based on wireless communication with an external device (e.g., the external device 330 of FIG. 3). The external device may be the mobile device or a separate wireless communication device, as described above with reference to FIG. 3. The wireless communication device may have a display module, but examples of which are not limited thereto. For example, the wireless communication device may be a tag device without having such a display module.

Referring to FIG. 4, in operation 430, when at least a portion of the extended screen to be provided at the reference display position is included in a field of view (FOV) area of an AR display module, the electronic device may provide a user with the portion of the extended screen through the AR display module. The FOV area of the AR display module may be an area corresponding to an observable extent by the eyes of the user wearing the electronic device and/or an eye box of the user. The screen display portions 215a and 215b described above with reference to FIG. 2 may each cover at least a portion of the FOV area of the AR display module. In an area in the FOV area that is covered by the screen display portions 215a and 215b, a virtual content and/or the extended screen may be displayed. In an embodiment, even before the reference display position is captured within the FOV area, the electronic device may output the portion of the extended screen captured within the FOV area. The output of the portion of the extended screen will be described in detail below with reference to FIG. 16.

FIGS. 5 through 9 are diagrams illustrating an example of providing an extended screen based on a mobile device according to various embodiments of the disclosure.

Hereinafter, an external device connected to an electronic device 510, which is a mobile device 520, will be described as an example with reference to FIG. 5.

Figure 5:
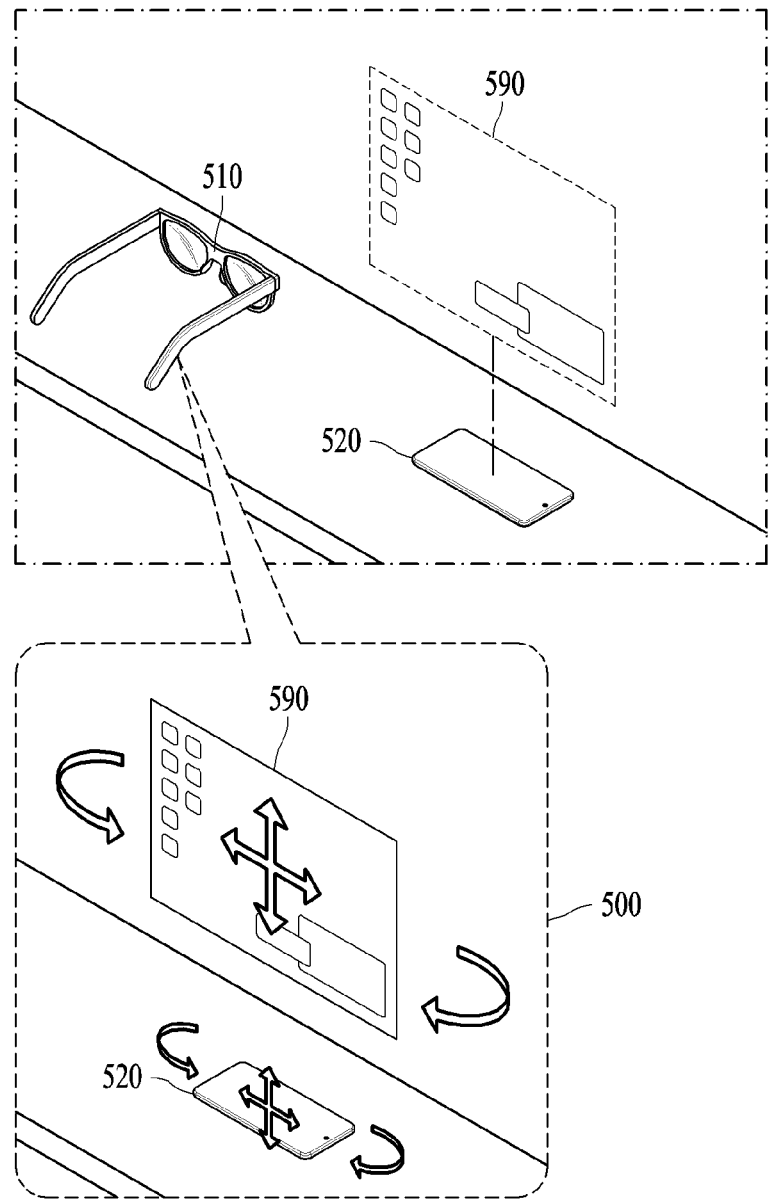
FIGS. 5, 6, 7, 8, and 9 are diagrams illustrating an example of providing an extended screen based on a mobile device according to various embodiments of the disclosure.

Referring to FIG. 5, the mobile device 520 may execute an extended screen application. The electronic device 510 may receive an extended screen 590 from the mobile device 520. The electronic device 510 may output the extended screen 590 on a virtual display plane determined based on a position of the mobile device 520 in an AR environment 500. The electronic device 510 may obtain position information and pose information between the mobile device 520 and the electronic device 510 while performing communication with the mobile device 520 in a UWB. The electronic device 510 and/or the mobile device 520 may estimate an angle of arrival (AOA) of the wireless communication signal by receiving the received wireless communication signal through multiple antennas. The electronic device 510 and/or the mobile device 520 may determine respective pose information (e.g., a difference in angle between an orientation of each device and a direction in which each of the two devices faces) using the estimated AOA. For example, the electronic device 510 may visualize the extended screen 590 at a position separated from one surface (e.g., the ground, or a surface of an object on which the mobile device 520 is disposed) on which the mobile device 520 is disposed in the AR environment 500 from the mobile device 520, and provide the user with the visualized extended screen 590. The estimation of position information and pose information will be described in detail below with reference to FIGS. 6 through 9.

In response to a change in at least one of a position or a pose of the mobile device 520, the electronic device 510 may change at least one of a position and a pose of the plane on which the extended screen 590 is visualized.

Figure 6:
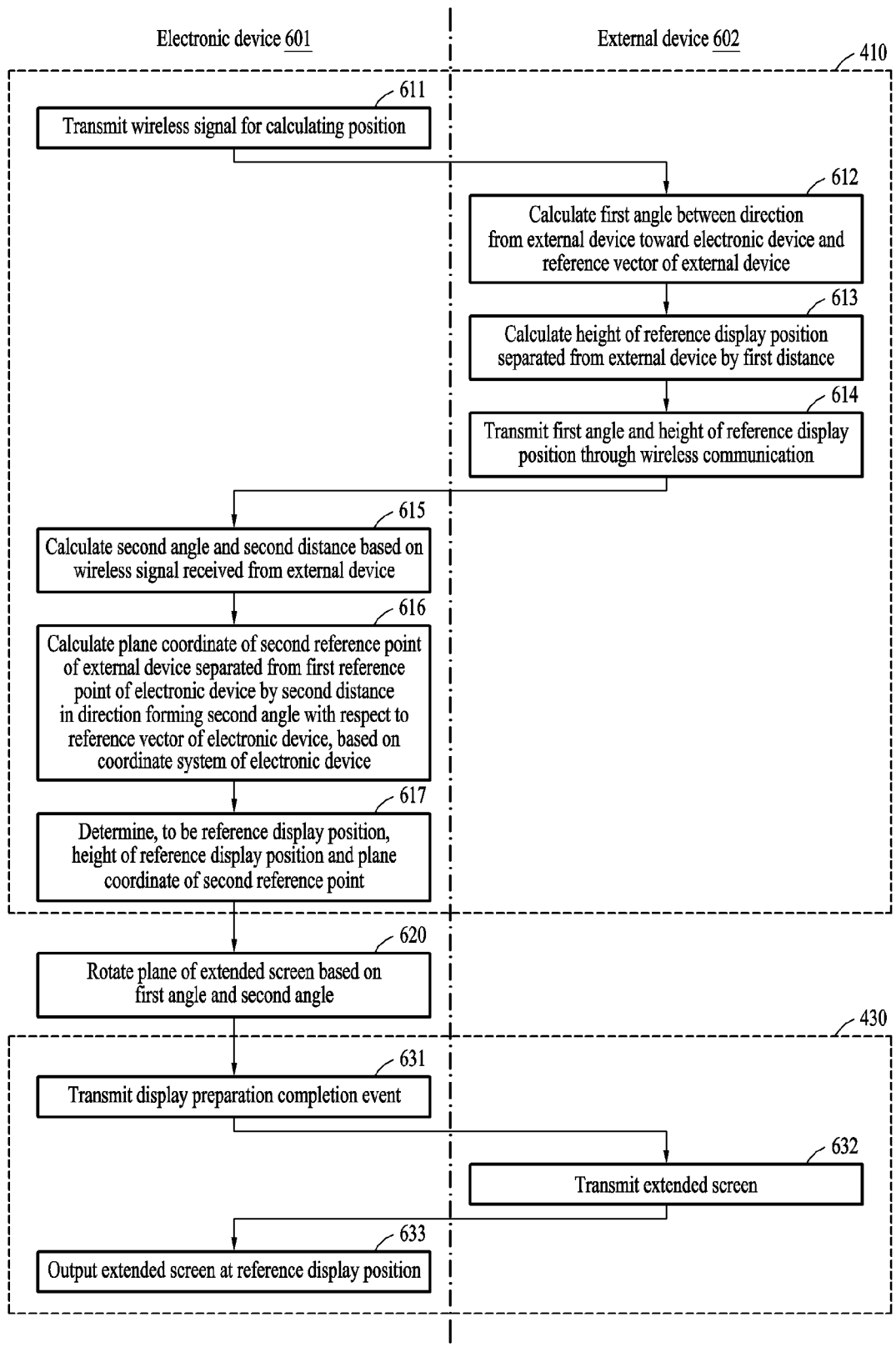
Figure 7:
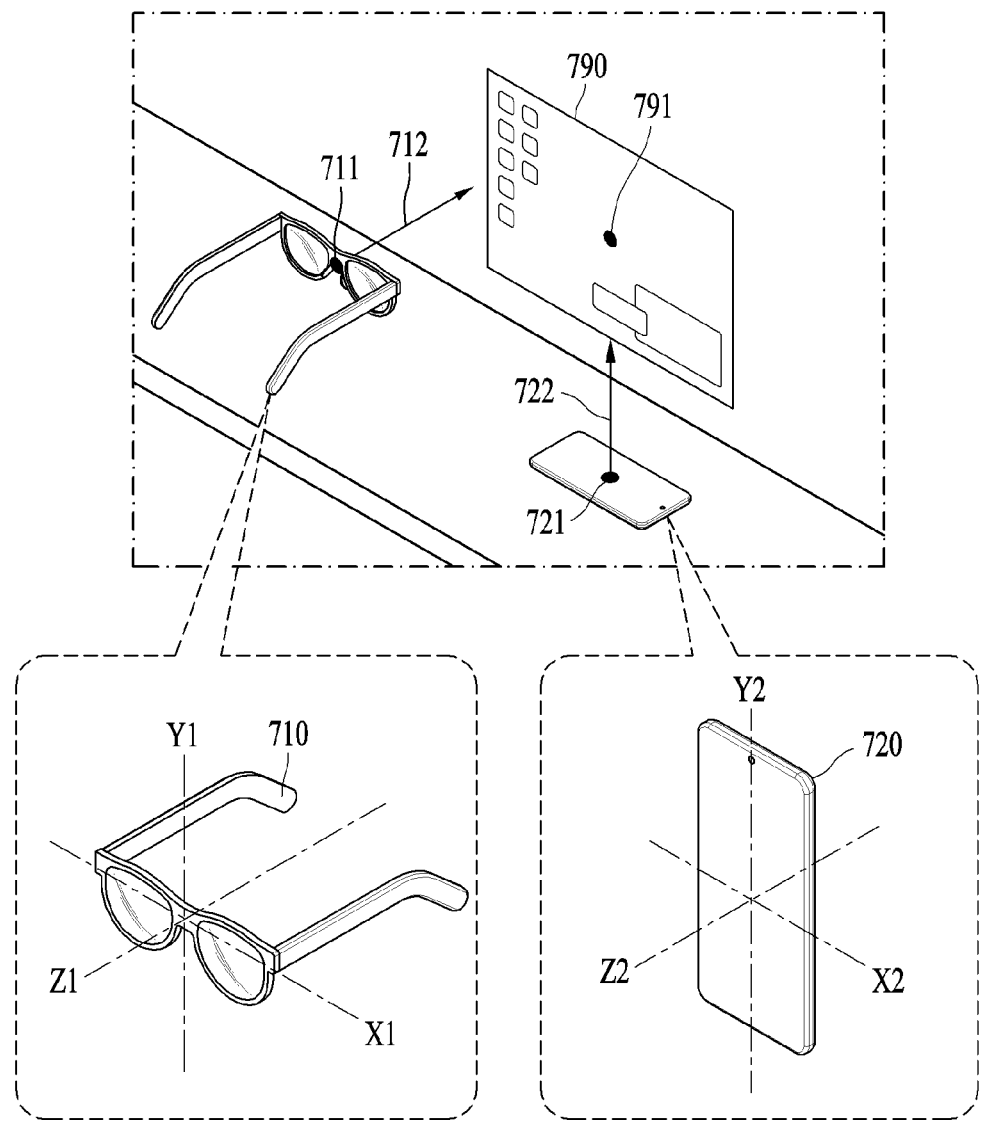
Figure 8:
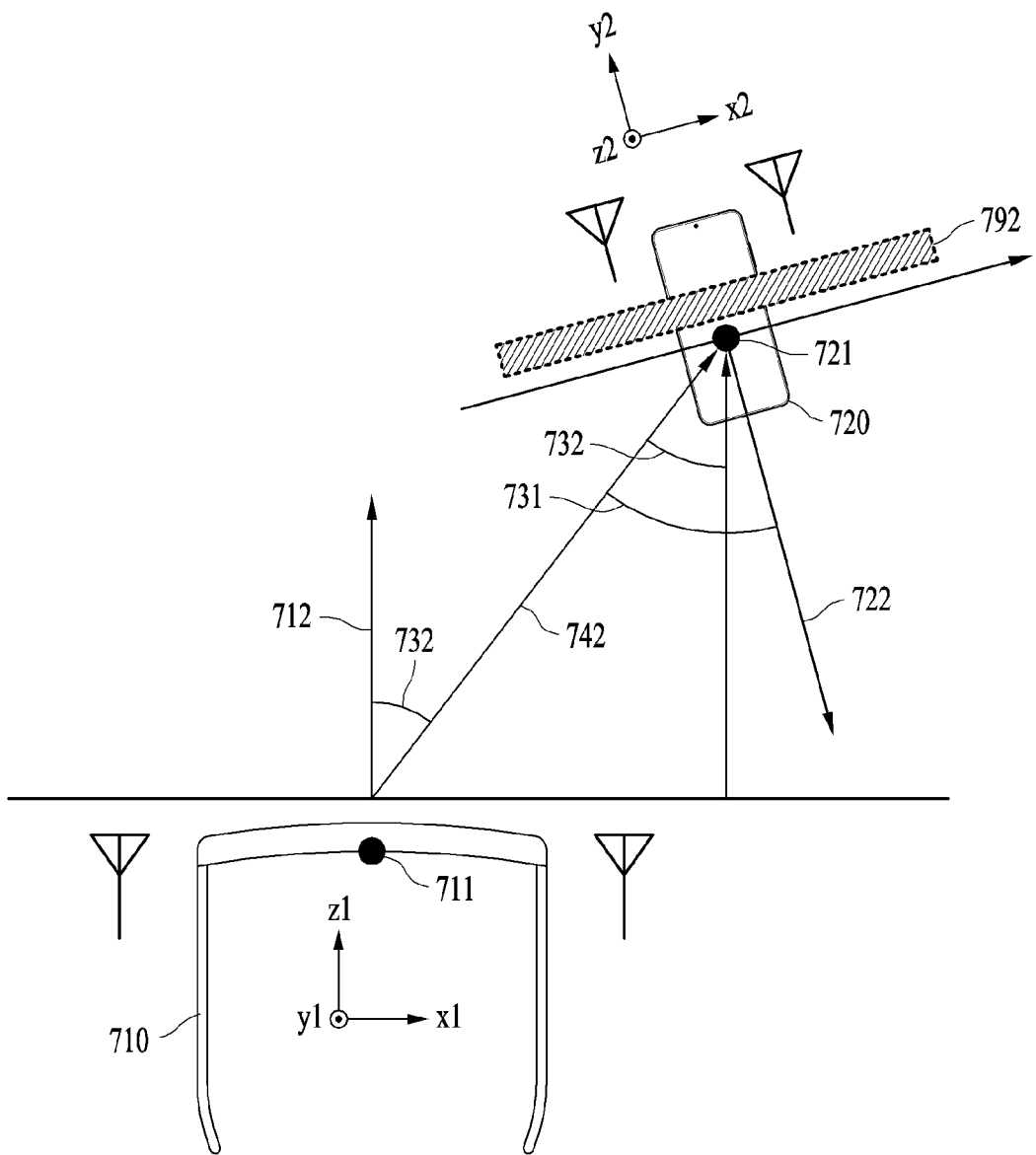
Figure 9:
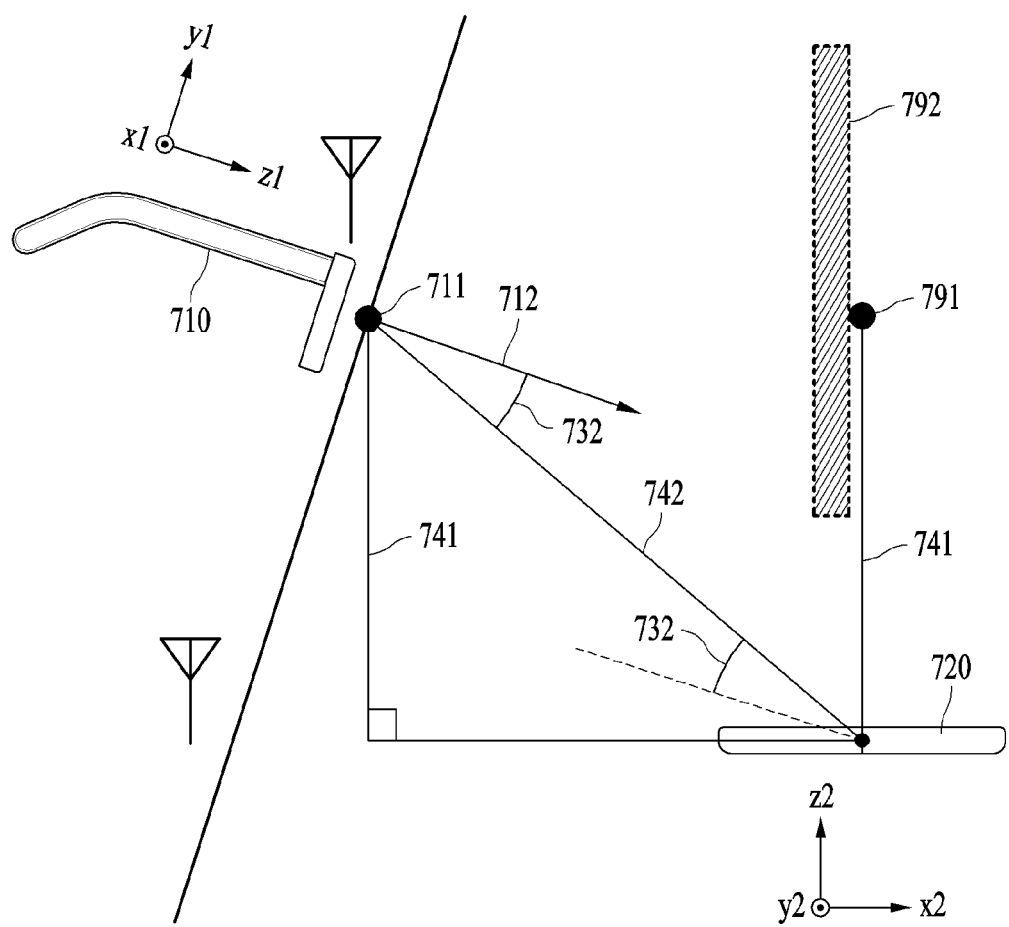

FIGS. 6 through 9 are diagrams illustrating an example of calculating position information and pose information between an electronic device (e.g., 601 of FIG. 6 and 710 of FIG. 7) (e.g., the electronic device 310 of FIG. 3) and an external device (e.g., 602 of FIG. 6 and 720 of FIG. 7) (e.g., the external device 330 of FIG. 3) when the external device is a mobile device (e.g., the mobile device 320 of FIG. 3). FIG. 6 is a flowchart illustrating a method of calculating position information and pose information. FIG. 7 is a perspective view of an electronic device and an external device in an AR environment, and FIGS. 8 and 9 are respectively a top view and a side view of the electronic device and the external device.

Referring to FIGS. 6-9, when the external device (e.g., 602 and 720) is a mobile device, a processor of the electronic device (e.g., 601 and 710) may determine, to be a reference display position 791, a position separated from one surface (e.g., a surface on which a display panel of the mobile device is disposed) of the mobile device. The reference display position 791 may be a position defined as a reference for displaying an extended screen 790, for example, a position at which a central point of the extended screen 790 is disposed. For example, the electronic device 601/710 may determine the reference display position 791 based on the external device 602/720 through operations to be described hereinafter with reference to FIG. 6. A first coordinate system (X1, Y1, Z1) of the electronic device 601/710 and a second coordinate system (X2, Y2, Z2) of the external device 602/720 may be defined as illustrated in FIG. 7, the electronic device 601/710 may calculate coordinates of the reference display position 791 based on the first coordinate system (X1, Y1, Z1).

For example, in operation 611, the electronic device 601/710 may transmit a wireless signal (e.g., a wireless communication signal) for calculating a position (e.g., the reference display position 791). For example, the electronic device 601/710 may transmit the wireless communication signal to the external device 602/720 in a UWB. However, a band for wireless communication is not limited to the UWB, and communication may be performed in another communication band. The electronic device 601/710 may radiate the wireless communication signal from a first reference point 711.

In operation 612, the external device 602/720 may calculate a first angle 731 between a direction toward the electronic device 601/710 and a reference vector 722 of the external device 602/720. In this case, pose information between the electronic device 601/710 and the external device 602/720 may include the first angle 731 as a relative pose between the electronic device 601/710 and the external device 602/720. The direction toward the electronic device 601/710 from the external device 602/720 may be a direction toward the first reference point 711 of the electronic device 601/710 from a second reference point 721 of the external device 602/720. The first reference point 711 may be, for example, a point at which a wireless communication signal is radiated from a wireless communication module of the electronic device 601/710, but examples are not limited thereto. The second reference point 721 may be, for example, a point at which a wireless communication signal is radiated from a wireless communication module of the external device 602/720, but examples are not limited thereto. The reference vector 722 of the external device 602/720 may be a vector perpendicular to a front surface (e.g., a surface on which a display panel of the mobile device is disposed) of the external device 602/720 from the second reference point 721. The external device 602/720 may include the communication module having three or more antennas with different receiving axes, and calculate the first angle 731 based on an AOA at which the wireless communication signal is received by the antennas.

In operation 613, the external device 602/720 may calculate a height of the reference display position 791 separated from the external device 602/720 by a first distance 741. In an embodiment, the external device 602/720 may calculate a height coordinate separated from one surface of the external device 602/720 by the first distance 741. For example, the electronic device 601/710 and/or the external device 602/720 may obtain the reference display position 791 based on a gaze height of a user. The first distance 741 may be a distance corresponding to a height from the ground and/or one surface of the external device 602/720, and may be determined based on the gaze height of the user. However, examples are not limited thereto, and the first distance 741 may be determined based on a height from the ground to the electronic device 601/710 without an additional process of determining the gaze height. As to be described below, using the first distance 741 may provide the extended screen 790 to a height of eyes of the user.

In addition, when an angle formed between a second distance 742 between the reference points 711 and 721 and a straight line between the reference points 711 and 721 with respect to the one surface of the external device 602/720 is given, the electronic device 601/710 and/or the external device 602/720 may calculate the second distance 742 by applying, to the second distance 742, a trigonometrical function (e.g., a sine function) that is based on the angle formed by the straight line between the reference points 711 and 721. However, examples are not limited to the foregoing, and the second distance 742 may be a preset value.

In operation 614, the external device 602/720 may transmit the first angle 731 and the height of the reference display position 791 through wireless communication.

In operation 615, the electronic device 601/710 may calculate a second angle 732 and the second distance 742 based on a wireless signal received from the external device 602/720. For example, the external device 602/720 may transmit a wireless communication signal along with the first angle 731 and the height of the reference display position 791 in operation 614. The wireless communication module of the electronic device 601/710 may include three or more antennas with different receiving axes, and the electronic device 601/710 may calculate the second angle 732 based on an AOA at which the antennas receive the wireless communication signal. For example, the electronic device 601/710 may calculate the second distance 742 between the reference points 711 and 721 based on strength of the received wireless communication signal and/or a time of flight (TOF) used for the signal transmission.

In operation 616, the electronic device 601/710 may calculate a plane coordinate of the second reference point 721 of the external device 602/720 that is separated from the first reference point 711 of the electronic device 601/710 by the second distance 742 in a direction forming the second angle 732 with respect to the reference vector 712 of the electronic device 601/710, based on the first coordinate system of the electronic device 601/710.

In operation 617, the electronic device 601/710 may determine, to be the reference display position 791, the height of the reference display position 791 and the plane coordinate of the second reference point 721. That is, the electronic device 601/710 may determine, to be coordinates of the reference display position 791, the height coordinate obtained in operation 613 and the plane coordinate obtained in operation 617. The reference display position 791 may be a position that floats from the external device 602/720.

In operation 620, the electronic device 601/710 may rotate a plane 792 of the extended screen 790 based on the first angle 731 and the second angle 732. For example, the electronic device 601/710 may determine a rotation angle of the plane 792 of the extended screen 790 by subtracting the second angle 732 from the first angle 731. Thus, when the mobile device is rotated on one axis perpendicular to the one surface of the mobile device, the processor of the electronic device 601/710 may rotate the plane 792 of the extended screen 790 in the same direction as a rotation direction in which the mobile device is rotated on the axis. The plane 792 of the extended screen 790 may thereby be rotated on a rotation axis parallel to a reference axis (e.g., a central axis perpendicular to one surface on which the display panel is disposed) of the external device 602/720. When the external device 602/720 is rotated clockwise with respect to the reference axis, the plane 792 of the extended screen 790 may be rotated clockwise with respect to the rotation axis to be output in operation 633. Similarly, when the external device 602/720 is rotated counterclockwise with respect to the reference axis, the plane 792 of the extended screen 790 may be rotated counterclockwise with respect to the rotation axis to be output in operation 633.

In operation 631, the electronic device 601/710 may transmit a display preparation completion event indicating the completion of preparation for displaying the extended screen 790.

In operation 632, the external device 602/720 may transmit the extended screen 790. For example, in response to the display preparation completion event being received from the electronic device 601/710, the external device 602/720 may transmit the extended screen 790 to the electronic device 601/710.

In operation 633, the electronic device 601/710 may output the extended screen 790 at the reference display position 791. For example, in response to the extended screen 790 being received from the external device 602/720, the electronic device 601/710 may provide the extended screen 790 on the plane 792 (or a virtual display plane) determined based on the reference display position 791. When the rotation angle is determined in operation 620, the electronic device 601/710 may output the extended screen 790 rotated by the rotation angle. The processor of the electronic device 601/710 may provide the user with the extended screen 790 on a plane non-parallel to a screen plane (e.g., one surface on which the display panel is disposed) of the mobile device in the AR environment. For example, the electronic device 601/710 may output the extended screen 790 on a virtual display plane that is substantially perpendicular to the screen plane.

Although operations 615, 616, and 617 are described above as being performed by the electronic device 601/710 and operations 612, 613, and 614 are described above as being performed by the external device 602/720, examples are not limited thereto. What has been described above with reference to FIG. 6 is provided merely as an example, and operations 612 through 617 may be performed by one of the electronic device 601/710 and the external device 602/720. In addition, the order of the foregoing operations is not limited to what has been described above with reference to FIG. 6, and operations 612, 613, and 614 may be performed after operations 615 and 616 are performed, for example. In this case, the height of the reference display position 791 may be calculated using a second angle and a second distance in operation 613.

Figure 10:
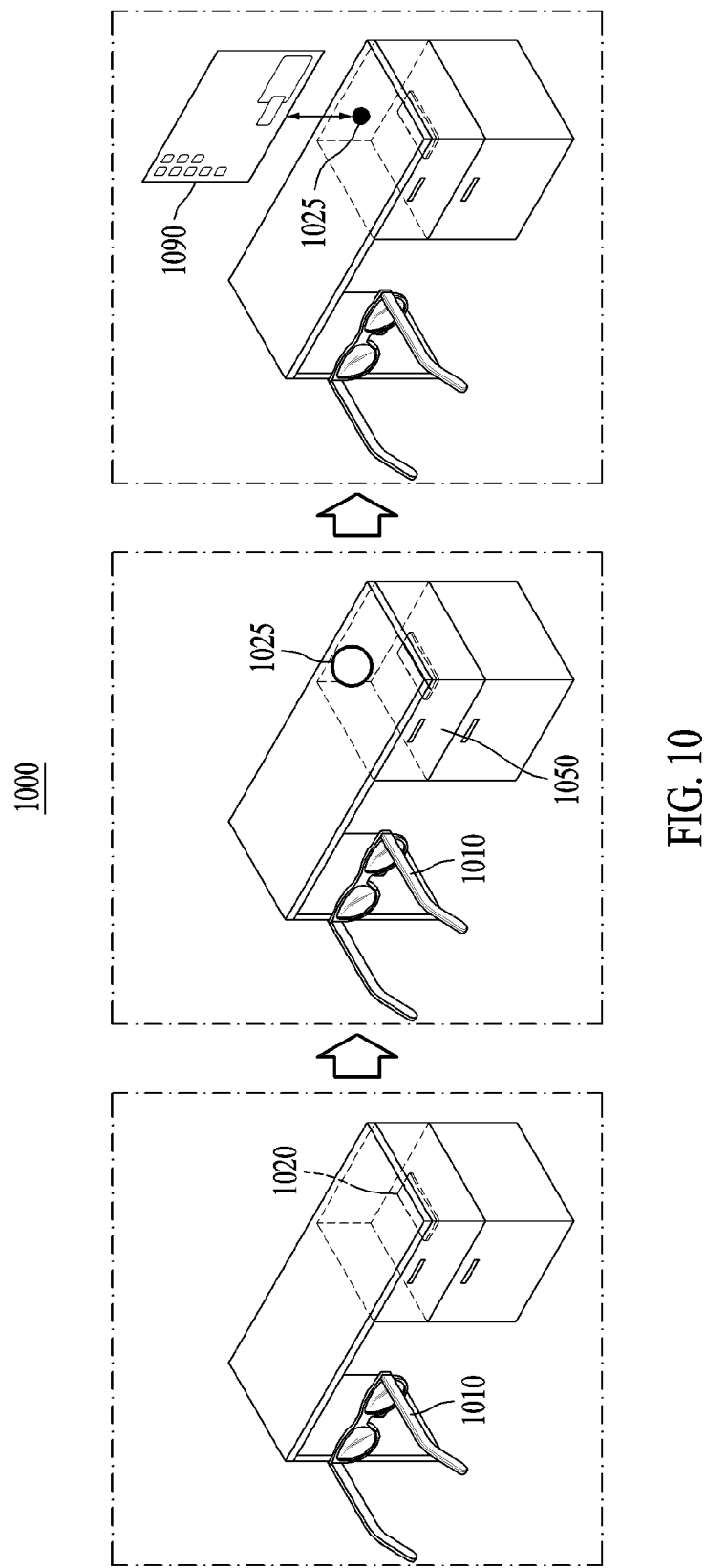
FIG. 10 is a diagram illustrating an example of providing an extended screen when a mobile device is hidden according to an embodiment of the disclosure.

FIG. 10 is a diagram illustrating an example of providing an extended screen when a mobile device is hidden according to an embodiment of the disclosure.

In an embodiment, an electronic device 1010 may establish communication with an external device 1020 (e.g., a mobile device) even when the external device 1020 is not visually exposed. For example, the electronic device 1010 may search for the external device 1020 hidden by an object 1050 using a wireless communication signal (e.g., a UWB signal) in a space corresponding to an AR environment 1000.

Referring to FIG. 10, the external device 1020 is stored in a desk drawer.

When detecting the external device 1020 in the space corresponding to the AR environment 1000, the electronic device 1010 may attempt to visually identify the external device 1020 within a FOV (e.g., a FOV of the imaging camera 245 of FIG. 2) of the electronic device 1010. When the external device 1020 is not visually identified in the FOV, the electronic device 1010 may visualize a notification content that indicates a hidden position of the external device 1020. For example, the electronic device 1010 may visualize the notification content at a point 1025 on the object 1050 hiding the external device 1020. The notification content may include a graphic representation that indicates, explicitly or implicitly, a type of the external device 1020.

In addition, when the external device 1020 is hidden by the object 1050 between the external device 1020 and the electronic device 1010, a processor of the electronic device 1010 may determine a reference display position based on the point 1025 on the object 1050. The electronic device 1010 may determine, to be the reference display position, a position separated from the point 1025 on the object 1050 in a direction perpendicular to one of the ground, one surface of the object 1050, and one surface of the external device 1020. The electronic device 1010 may visualize an extended screen 1090 of the mobile device at the determined reference display position. While visualizing the extended screen 1090, the electronic device 1010 may update, in real time, coordinates of the reference display position in response to a change in relative position and angle between the electronic device 1010 and the external device 1020, through calculation of an AOA based on transmission and reception of the wireless communication signal. Thus, even when the external device 1020 is hidden by the object 1050, the electronic device 1010 may display the extended screen 1090 at a position adjacent to the external device 1020 using the wireless communication signal (e.g., the UWB signal). The electronic device 1010 may thereby provide the extended screen 1090 at a more intuitive position.

The notification content may also include information (including, for example, the number of messages yet to be checked after being received and a summary of contents of a received message) indicating a message received from the external device 1020. When receiving a message from the external device 1020, the electronic device 1010 may visualize the notification content at a position corresponding to the external device 1020. For example, in response to a manipulation activating the notification content (e.g., a manipulation of the user touching a space occupied by the notification content in the AR environment 1000 with their body), the electronic device 1010 may visualize the extended screen 1090. The user may thereby have a desktop experience by checking a notification readily and handling a related task.

FIGS. 11 through 15 are diagrams illustrating an example of providing an extended screen based on a wireless communication device according to various embodiments of the disclosure.

Figure 11:
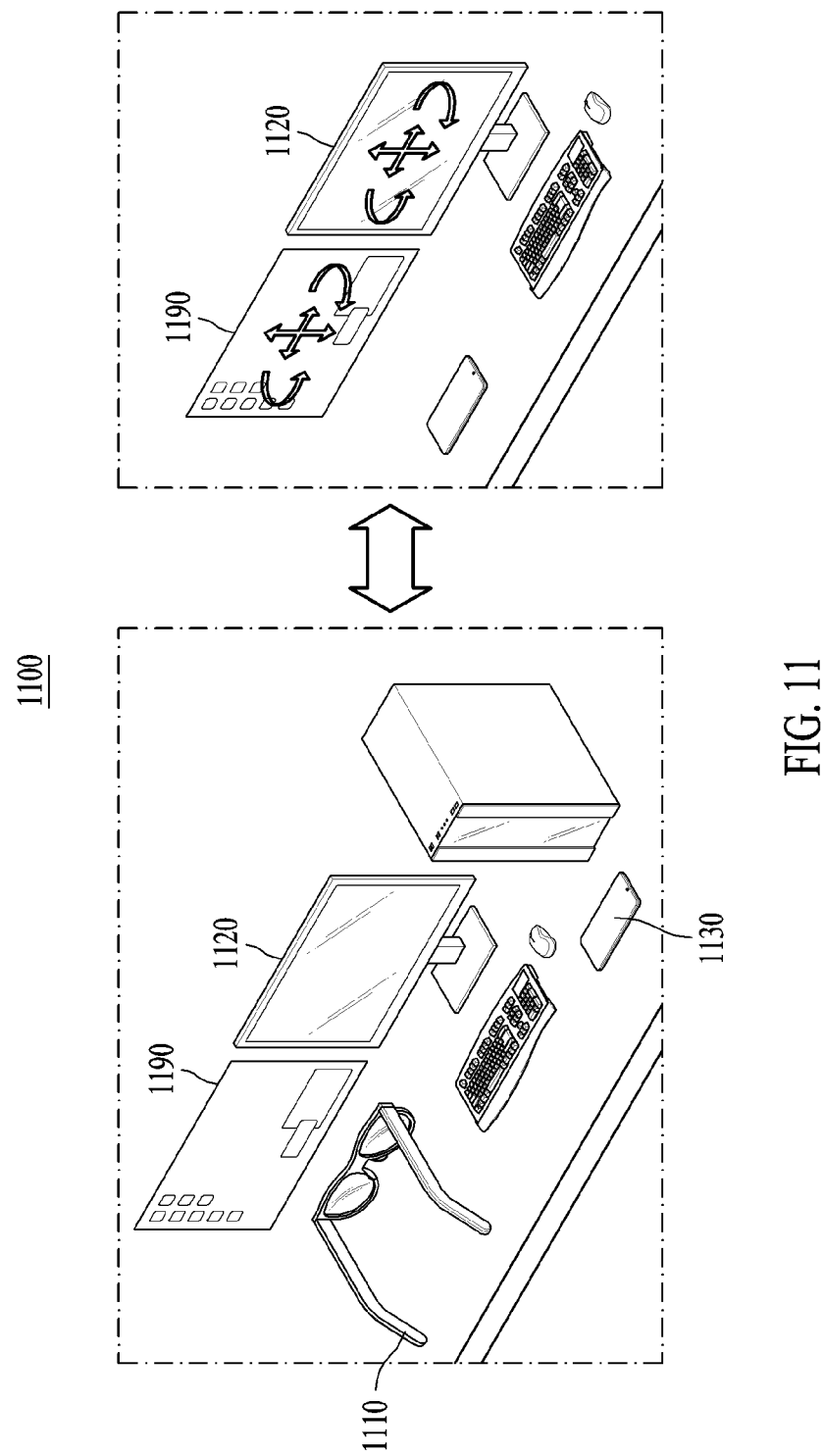
FIGS. 11, 12, 13, 14, and 15 are diagrams illustrating an example of providing an extended screen based on a wireless communication device according to various embodiments of the disclosure.

FIG. 11 is a diagram illustrating an example of an external device 1120 connected to an electronic device 1110 being a separate and independent wireless communication device from a mobile device 1130. Although the wireless communication device is illustrated as a device including a display module in FIG. 11, examples of which are not limited thereto.

Referring to FIG. 11, the mobile device 1130 may execute an extended screen application. The electronic device 1110 may receive an extended screen 1190 from the mobile device 1130. The electronic device 1110 may output the extended screen 1190 on a virtual display plane determined based on a position of the external device 1120 in an AR environment 1100.

The electronic device 1110 may obtain position information and pose information between the external device 1120 and the electronic device 1110 while communicating with the external device 1120 in a UWB. The electronic device 1110 and/or the external device 1120 may receive a wireless communication signal through multiple antennas and estimate an AOA of the wireless communication signal. The electronic device 1110 and/or the external device 1120 may determine respective pose information (e.g., a difference in angle between an orientation of each device and a direction in which each of the two devices faces) using the estimated AOA. For example, the electronic device 1110 may visualize the extended screen 1190 at a position separated from the external device 1120 in the AR environment 1100, and provide a visualized screen to a user. The electronic device 1110 may determine, to be a reference display position, a non-overlapping position between a display module of the external device 1120 and the extended screen 1190. The electronic device 1110 may output the extended screen 1190 around the display module of the external device 1120, for example, on one side (e.g., side, upward, or downward), excluding front and back sides of the display panel. The electronic device 1110 may thereby provide the user with the extended screen 1190 without a hindrance by a screen of the display module of the external device 1120. To this end, the external device 1120 may share, with the electronic device 1110, physical size information (including, for example, a screen size and a position of a communication module in a device) of the display module of the external device 1120 while communicating wirelessly (e.g., communicating in the UWB). The electronic device 1110 and/or the external device 1120 may calculate an accurate reference display position using the screen size of the display module of the external device 1120 which is the shared information. The estimation of position information and pose information will be described in detail below with reference to FIGS. 12 through 14.

In response to a change in at least one of a position or a pose of the external device 1120, the electronic device 1110 may change at least one of a position or a pose of a plane on which the extended screen 1190 is visualized. That is, in response to a manipulation (e.g., moving and rotating) performed by the user on the external device 1120, the electronic device 1110 may move and rotate the extended screen 1190. For example, when the external device 1120 moves, the electronic device 1110 may move the extended screen 1190 in response to a position of the external device 1120 that is changed by the movement.

Figure 12:
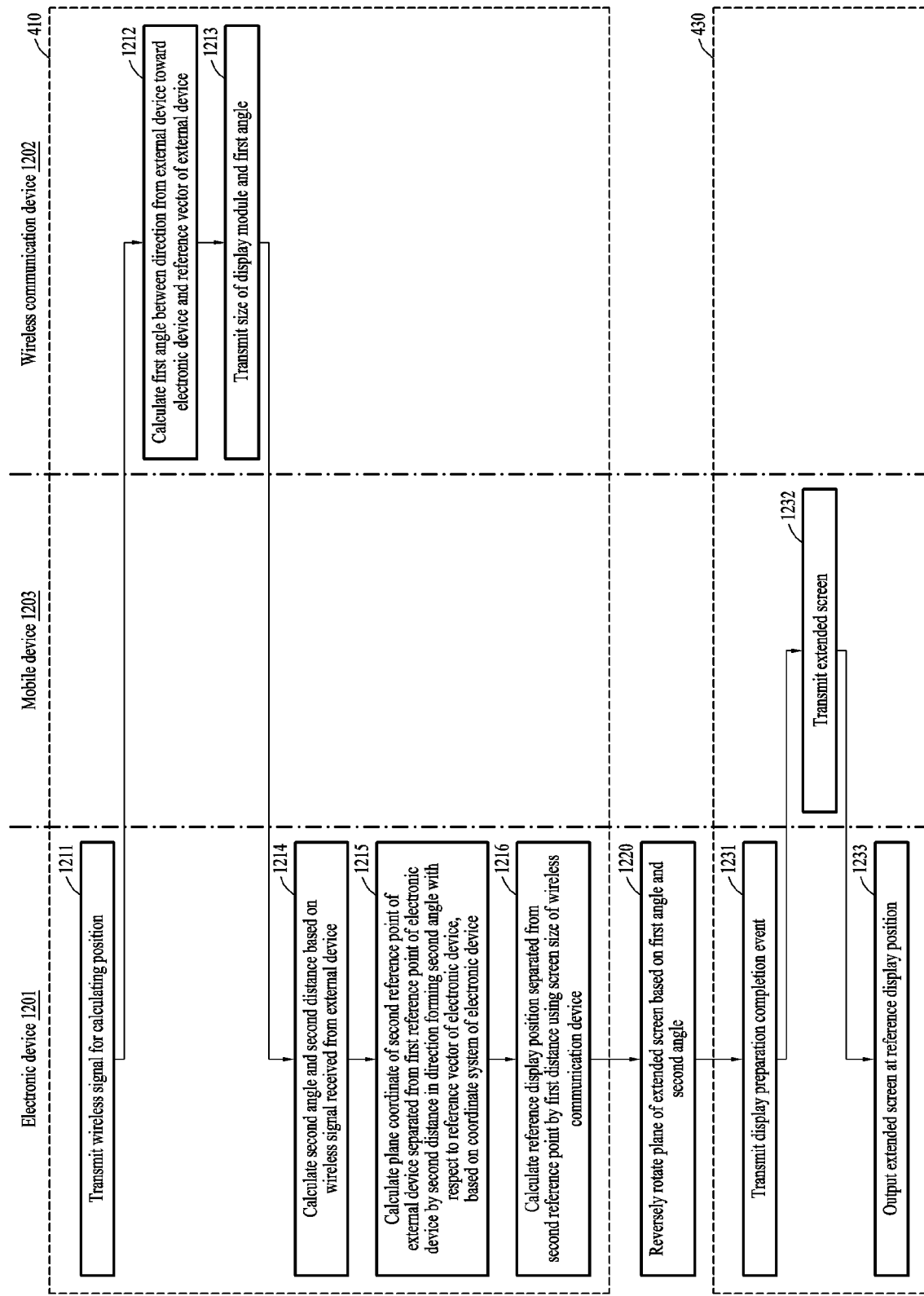
Figure 13:
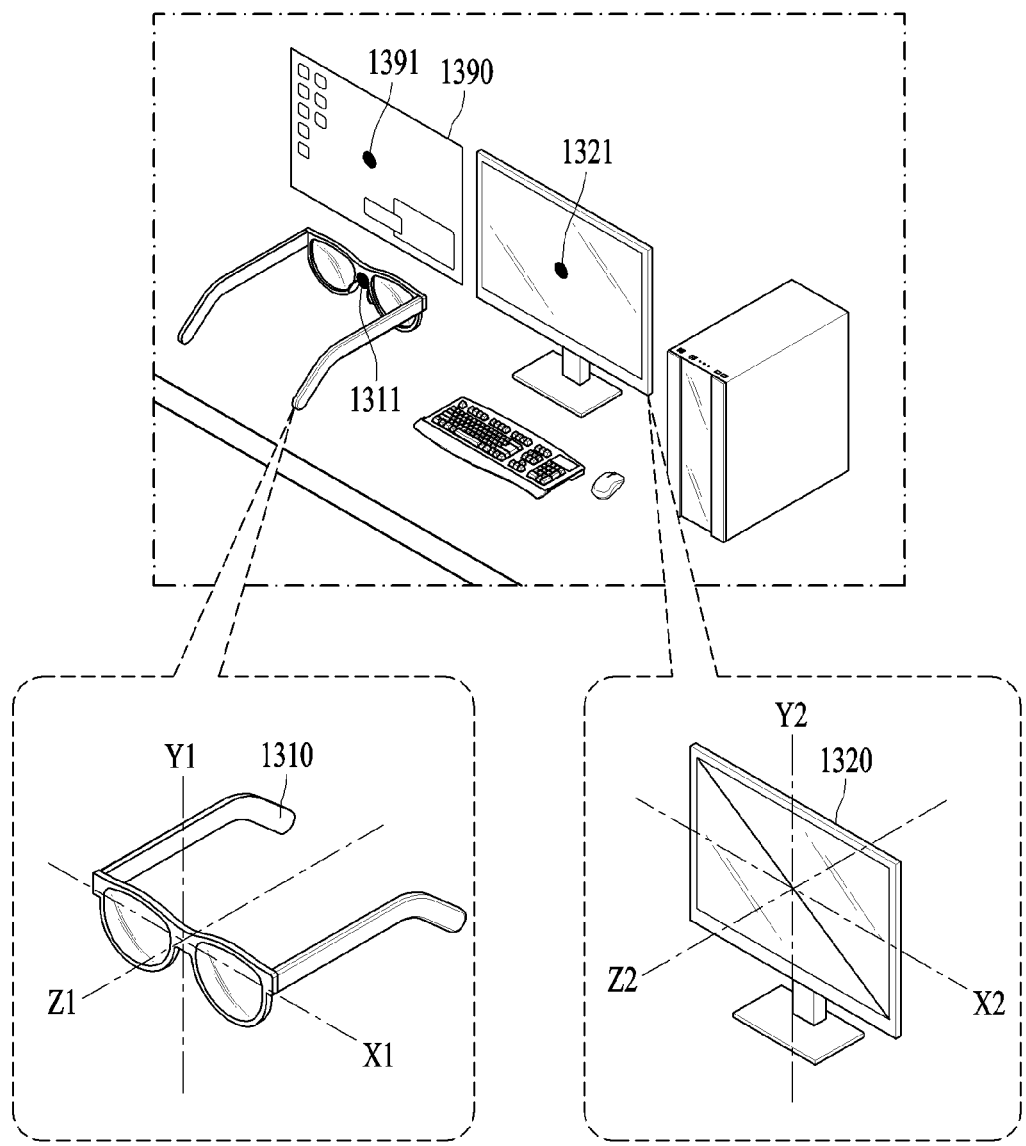
Figure 14:
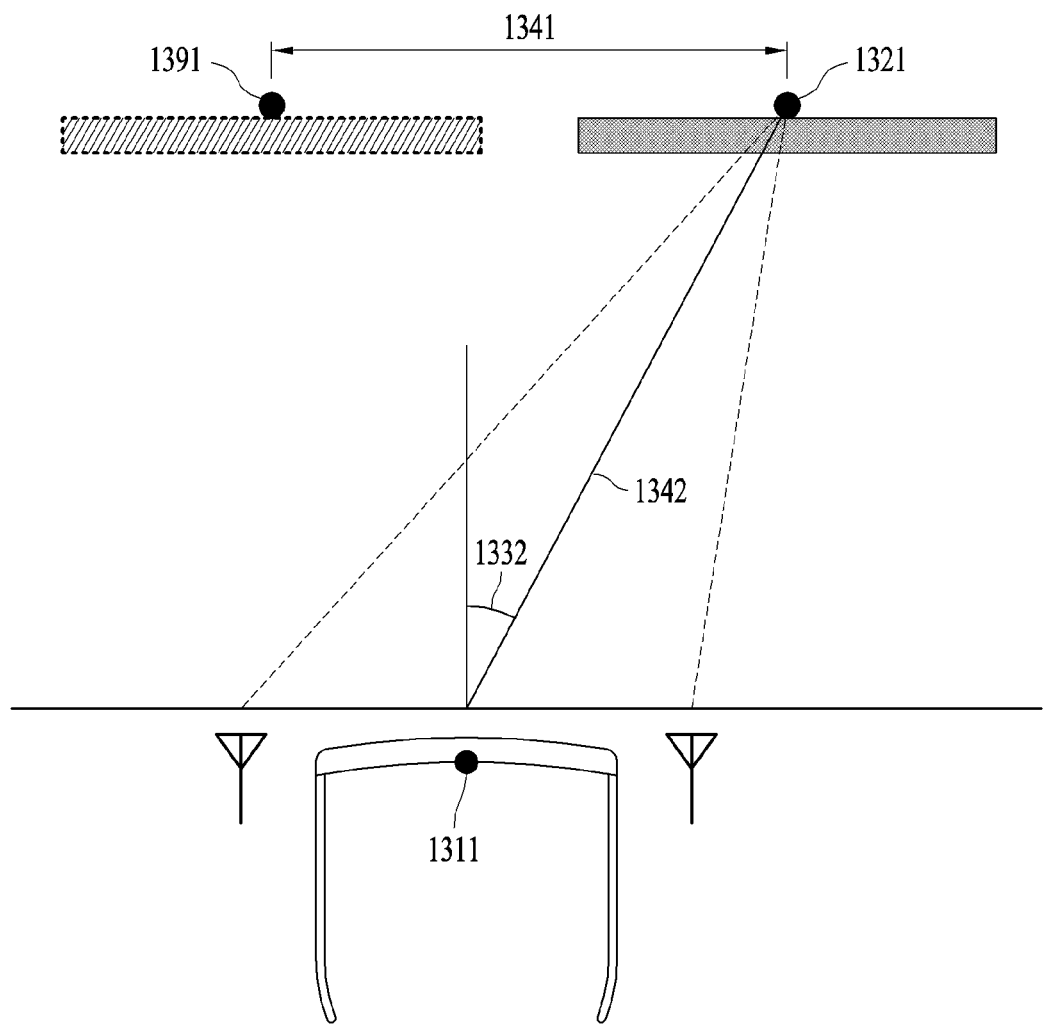
Figure 15:
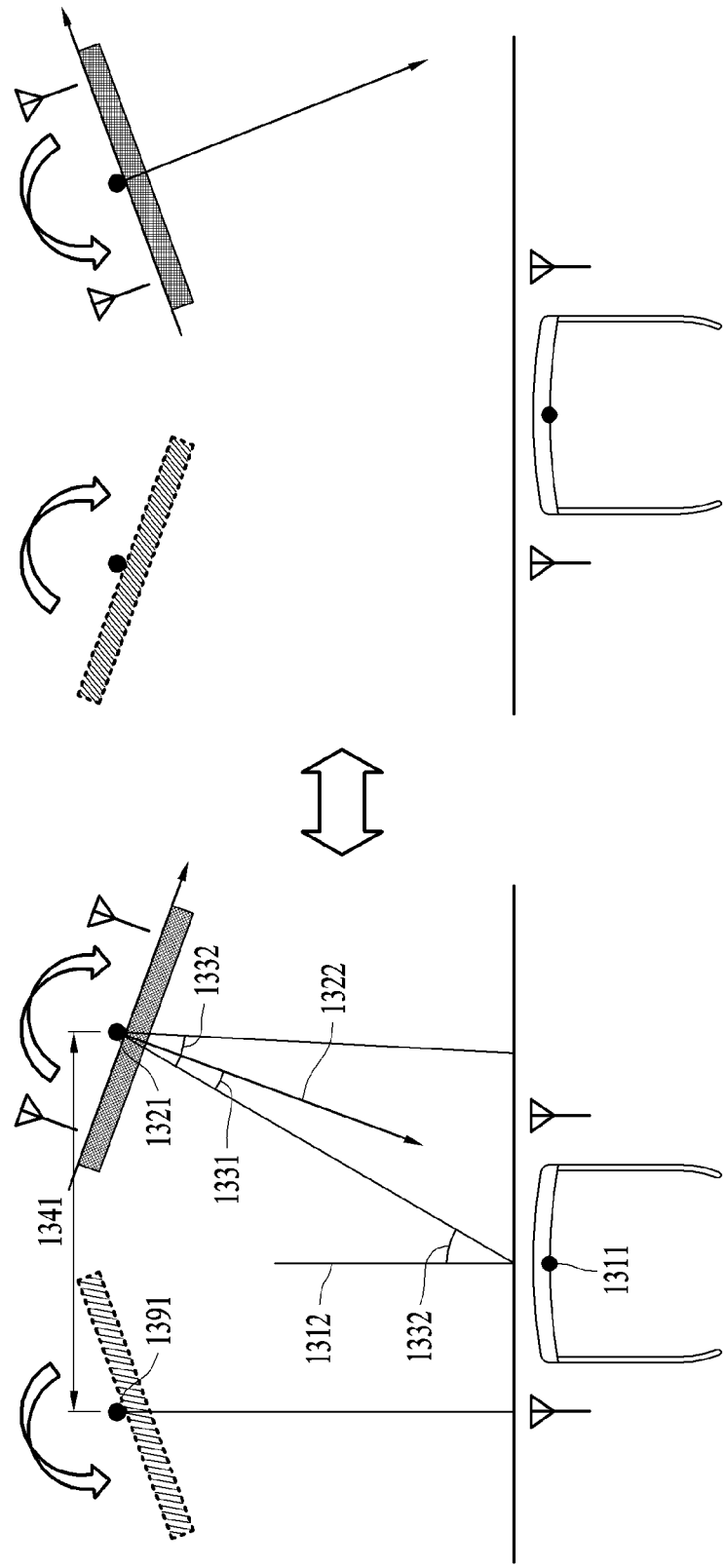

FIGS. 12 through 15 are diagrams illustrating an example of calculating position information and pose information between an electronic device (e.g., 1201 of FIG. 12 and 1310 of FIG. 13) (e.g., the electronic device 310 of FIG. 3) and an external device (e.g., 1202 of FIG. 12 and 1320 of FIG. 13) (e.g., the external device 330 of FIG. 3) when the external device 1202/1320 is a wireless communication device. FIG. 12 is a flowchart illustrating a flow of operations performed to calculate the position information and the pose information. FIG. 13 is a perspective view of the electronic device 1201/1310 and the external device 1202/1320 in an AR environment. FIG. 14 is a top view thereof when they stand still, and FIG. 15 is a top view thereof at a rotation. Although a mobile device (e.g., the mobile device 320 of FIG. 3) is not illustrated in FIGS. 13 through 15, the mobile device may establish communication with the electronic device 1201/1310 and the external device 1202/1320.

Referring to FIGS. 12-15, when the external device 1202/1320 is another wireless communication device, a processor of the electronic device 1201/1310 may determine, to be a reference display position 1391, a position set by the wireless communication device based on the wireless communication device. The reference display position 1391 may be a position defined as a reference for displaying the extended screen 1390, and may be a position at which a central point of the extended screen 1390 is disposed, for example. For example, the electronic device 1201/1310 may determine the reference display position 1391 based on the external device 1202/1320 through operations to be described with reference to FIG. 12. A first coordinate system (X1, Y1, Z1) of the electronic device 1201/1310 and a second coordinate system (X2, Y2, Z2) of the external device 1202/1320 may be defined as illustrated in FIG. 13, and the electronic device 1201/1310 may calculate coordinates of the reference display position 1391 based on the first coordinate system (X1, Y1, Z1).

For example, in operation 1211, the electronic device 1201/1310 may transmit a wireless signal (e.g., a wireless communication signal) for calculating a position (e.g., the reference display position 1391). For example, the electronic device 1201/1310 may transmit the wireless communication signal to the external device 1202/1320 in a UWB. However, a band for wireless communication is not limited to the UWB, and the communication may be performed in another communication band. The electronic device 1201/1310 may radiate the wireless communication signal from a first reference point 1311.

In operation 1212, the external device 1202/1320 may calculate a first angle 1331 between a direction from the external device 1202/1320 toward the electronic device 1201/1310 and a reference vector 1322 of the external device 1202/1320. In this case, pose information between the electronic device 1201/1310 and the external device 1202/1320 may include the first angle 1331 as a relative pose between the electronic device 1201/1310 and the external device 1202/1320. The direction from the external device 1202/1320 toward the electronic device 1201/1310 may be a direction from a second reference point 1321 of the external device 1202/1320 toward the first reference point 1311 of the electronic device 1201/1310. For example, the first reference point 1311 may be a point at which a wireless communication module of the electronic device 1201/1310 radiates a wireless communication signal, but examples of which are not limited thereto. Also, the second reference point 1321 may be a point at which a wireless communication module of the external device 1202/1320 radiates a wireless communication signal, but examples of which are not limited thereto. The reference vector 1322 of the external device 1202/1320 may be a vector perpendicular to a front surface (e.g., a surface on which a display panel of the wireless communication device is disposed) of the external device 1202/1320 from the second reference point 1321. The external device 1202/1320 may include the communication module having three or more antennas with different receiving axes, and may calculate the first angle 1331 based on an AOA at which the antennas receive the wireless communication signal.

In operation 1213, the external device 1202/1320 may transmit, to the electronic device 1201/1310, a size of a display module of the wireless communication device and the first angle 1331. In this case, information associated with the size of the display module may include, for example, one of or a combination of two or more of a diagonal length of a plane of the display panel, a horizontal length of the plane, and a vertical length of the plane.

However, examples are not limited to the foregoing example where the external device 1202/1320 transmits the screen size of the display module. For example, the external device 1202/1320 may transmit, to the electronic device 1201/1310, information (e.g., a relative distance and a relative direction) defining a relative position of the reference display position 1391 with respect to the second reference point 1321 of the external device 1202/1320, and thus a position at which the extended screen 1390 is to be displayed may be indicated by the external device 1202/1320.

In operation 1214, the electronic device 1201/1310 may calculate a second angle 1332 and a second distance 1342 based on the wireless communication signal received from the external device 1202/1320. For example, the external device 1202/1320 may transmit the wireless communication signal along with the first angle 1331 and the screen size of the display module in operation 1213. The wireless communication module of the electronic device 1201/1310 may include three or more antennas having different receiving axes, and the electronic device 1201/1310 may calculate the second angle 1332 based on an AOA at which the antennas receive the wireless communication signal. The electronic device 1201/1310 may calculate the second distance 1342 between the reference points 1311 and 1321 based on strength of the received wireless communication signal and/or a TOF used for signal transmission.

In operation 1215, the electronic device 1201/1310 may calculate a plane coordinate of the second reference point 1321 of the external device 1202/1320 that is separated from the first reference point 1311 of the electronic device 1201/1310 by the second distance 1324 in a direction forming the second angle 1332 with respect to the reference vector 1312 of the electronic device 1201/1310, based on the first coordinate system of the electronic device 1201/1310.

In operation 1216, the electronic device 1201/1310 may calculate the reference display position 1391 separated from the second reference point 1321 by the first distance 1341 using the screen size of the wireless communication device. For example, when the wireless communication device includes a display module, the electronic device 1201/1310 may determine, to be the reference display position 1391, a position separated by a distance determined based on a screen size of the display module. That is, the electronic device 1201/1310 may determine the first distance 1341 based on the screen size of the display module. The first distance 1341 may be a non-overlapping distance by which a display screen of the display module and the extended screen 1390 do not overlap each other, and may be a length that is greater than or equal to one of a horizontal length, a vertical length, and a diagonal length of the display module. For example, when the extended screen 1390 is disposed in parallel to the wireless communication device in a horizontal direction, the first distance 1341 may have a value that is greater than or equal to the horizontal length of the display module of the wireless communication device. For another example, when the extended screen 1390 is disposed in parallel to the wireless communication device in a vertical direction, the first distance 1341 may have a value that is greater than or equal to the vertical length of the display module of the wireless communication device. For still another example, when the extended screen 1390 is disposed in parallel to the wireless communication device in a diagonal direction, the first distance 1341 may have a value that is greater than or equal to the diagonal length of the display module of the wireless communication device. Thus, the reference display position 1391 may be a position separated such that the extended screen 1390 does not hinder an output of a screen of the external device 1202/1320.

In operation 1220, the electronic device 1201/1310 may rotate a plane of the extended screen 1390 based on the first angle 1331 and the second angle 1332. For example, the electronic device 1201/1310 may determine a rotation angle of the plane of the extended screen 1390 by subtracting the second angle 1332 from the first angle 1331. Thus, when the display module is rotated on a rotation axis of the wireless communication device, the processor of the electronic device 1201/1310 may rotate the plane of the extended screen 1390 in a direction (e.g., an opposite direction) different from a rotation direction of the display module with respect to the rotation axis. When the external device 1202/1320 is rotated clockwise with respect to a reference axis, the plane of the extended screen 1390 may be rotated counterclockwise with respect to the rotation axis and the rotated plane may be output in operation 1233. Similarly, when external device 1202/1320 is rotated counterclockwise with respect to the reference axis, the plane of the extended screen 1390 may be rotated clockwise with respect to the rotation axis and the rotated plane may be output in operation 1233.

In operation 1231, the electronic device 1201/1310 may transmit, to a mobile device 1203, a display preparation completion event indicating the completion of preparation for displaying the extended screen 1390.

In operation 1232, the mobile device 1203 may transmit the extended screen 1390. For example, in response to the display preparation completion event being received from the electronic device 1201/1310, the mobile device 1203 may transmit the extended screen 1390 to the electronic device 1201/1310.

In operation 1233, the electronic device 1201/1310 may output the extended screen 1390 at the reference display position 1391. For example, the in response to the extended screen 1390 being received from the mobile device 1203, the electronic device 1201/1310 may provide the extended screen 1390 on a virtual display plane determined based on the reference display position 1391. When the rotation angle is determined in operation 1220, the electronic device 1201/1310 may output the extended screen 1390 rotated by the rotation angle. An angle formed by the screen plane of the display module of the wireless communication device with respect to the ground in an AR environment may be the same as an angle formed by the plane of the extended screen 1390 with respect to the ground. Thus, the electronic device 1201/1310 may provide the user with an extended screen having the same tilting angle as the display module of the wireless communication device without an additional setting, thereby providing the user with a more consistent desktop experience.

Although operations 1214, 1215, and 1216 are described above as being performed by the electronic device 1201/1310 and operations 1212 and 1213 are described above as being performed by the external device 1202/1320, examples are not limited thereto. What has been described above with reference to FIG. 12 is provided merely as an example, and operations 1212 through 1216 may be performed by one of the electronic device 1201/1310 and the external device 1202/1320. In addition, the order of the foregoing operations is not limited to what has been described above with reference to FIG. 12, and operations 1212 and 1213 may be performed after operations 1214, 1215, and 1216 are performed, for example.

Figure 16:
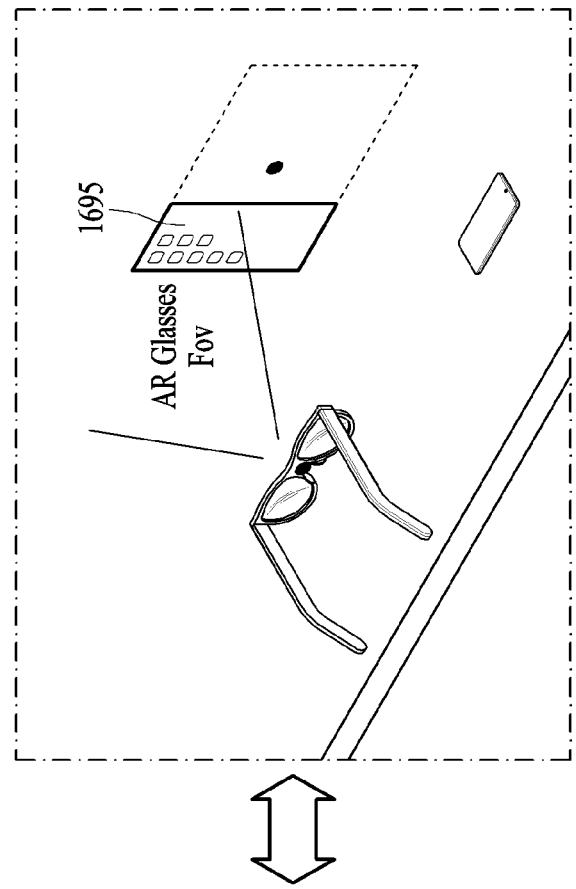
FIG. 16 is a diagram illustrating an example of providing a portion of an extended screen based on a field of view (FOV) of an electronic device according to an embodiment of the disclosure.
Figure 16:
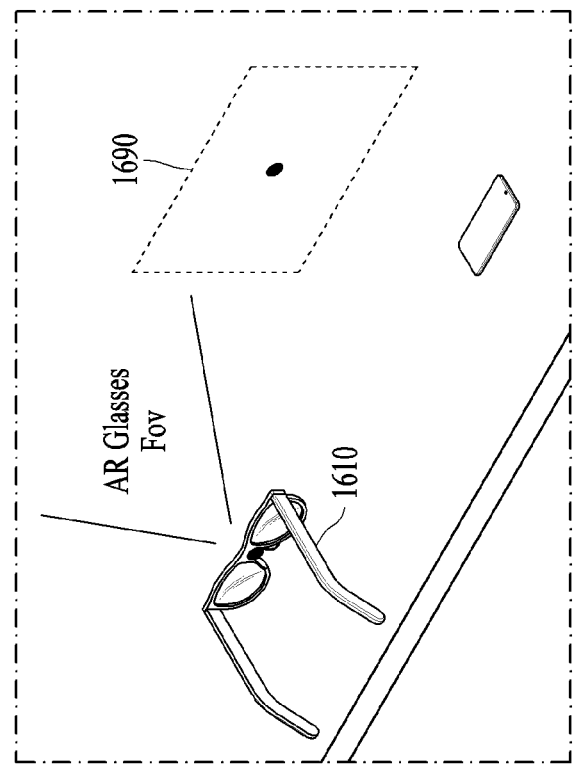

FIG. 16 is a diagram illustrating an example of providing a portion of an extended screen based on a FOV of an electronic device according to an embodiment of the disclosure.

Referring to FIG. 16, an electronic device 1610 may establish connection to an external device (e.g., a mobile device or a wireless communication device) through wireless communication (e.g., communication in a UWB) as described above. The electronic device 1610 may establish wireless communication even though the external device is not visible within an area corresponding to a FOV. When wireless communication is established with a non-observable external device in an area out of a FOV of the electronic device 1610, the electronic device 1610 may perform a preparation operation for visualizing an extended screen 1690 of a mobile device. After the establishment of the connection to the external device, the electronic device 1610 may calculate and track a positional relationship between an area corresponding to the FOV of the electronic device 1610 and the extended screen 1690. For example, the electronic device 1610 may determine a plane equation for a plane on which the extended screen 1690 is to be disposed, based on a reference display position based on a first reference point (e.g., a point from which a wireless communication module of the electronic device 1610 radiates a wireless communication signal). The electronic device 1610 may calculate two linear equations (straight line equations) indicating a boundary line of the FOV on the plane (e.g., an X1Y1 plane of a first coordinate system of the electronic device 1610), based on the first reference point. The electronic device 1610 may determine an intersection point between the two linear equations and the plane equation described above. The electronic device 1610 may monitor whether the intersection point between the two linear equations and the plane equation is in a plane area of the extended screen 1690 determined based on the reference display position.

When at least a portion 1695 of the extended screen 1690 to be provided at the reference display position is included in a FOV area of an AR display module, the electronic device 1610 may provide a user with the portion 1695 through the AR display module. For example, when the intersection point between the two linear equations and the plane equation is detected in the plane area of the extended screen 1690, the electronic device 1610 may determine the portion 1695 of the extended screen 1690 that is included in the FOV of the electronic device 1610 based on the intersection point. That is, the electronic device 1610 may hold an output when the extended screen 1690 is not included in the FOV even when the external device is detected through wireless communication, and provide the user with the extended screen 1690 starting from the portion 1695 when the portion 1695 comes within the FOV. When the extended screen 1690 is fully included in the FOV, the electronic device 1610 may provide an entire area of the extended screen 1690 in the AR environment. The electronic device 1610 may not require vision recognition of markers, and may thus immediately provide the user with the portion 1695 as described above.

In addition, when the portion 1695 is not included in the FOV area, the communication module of the electronic device 1610 may perform communication with the external device at a first data rate. When the portion 1695 is included in the FOV area, the communication module of the electronic device 1610 may perform communication with the external device at a second data rate different from the first data rate. The first data rate may be a lower data rate than the second data rate. That is, until the extended screen 1690 comes within the FOV, the electronic device 1610 may monitor a positional relationship between the extended screen 1690 and the FOV of the electronic device 1610 based on the reference display position that is determined based on a reference point of the external device at the low data rate. When the portion 1695 of the extended screen 1690 comes within the FOV, the electronic device 1610 may increase a communication speed to the second data rate, thereby minimizing disconnection of playback of the extended screen 1690. For example, the second data rate may be determined based on a frame rate (e.g., 60 frames per second (FPS) and 120 FPS) for providing a screen provided by the AR display module of the electronic device 1610.

Figure 17:
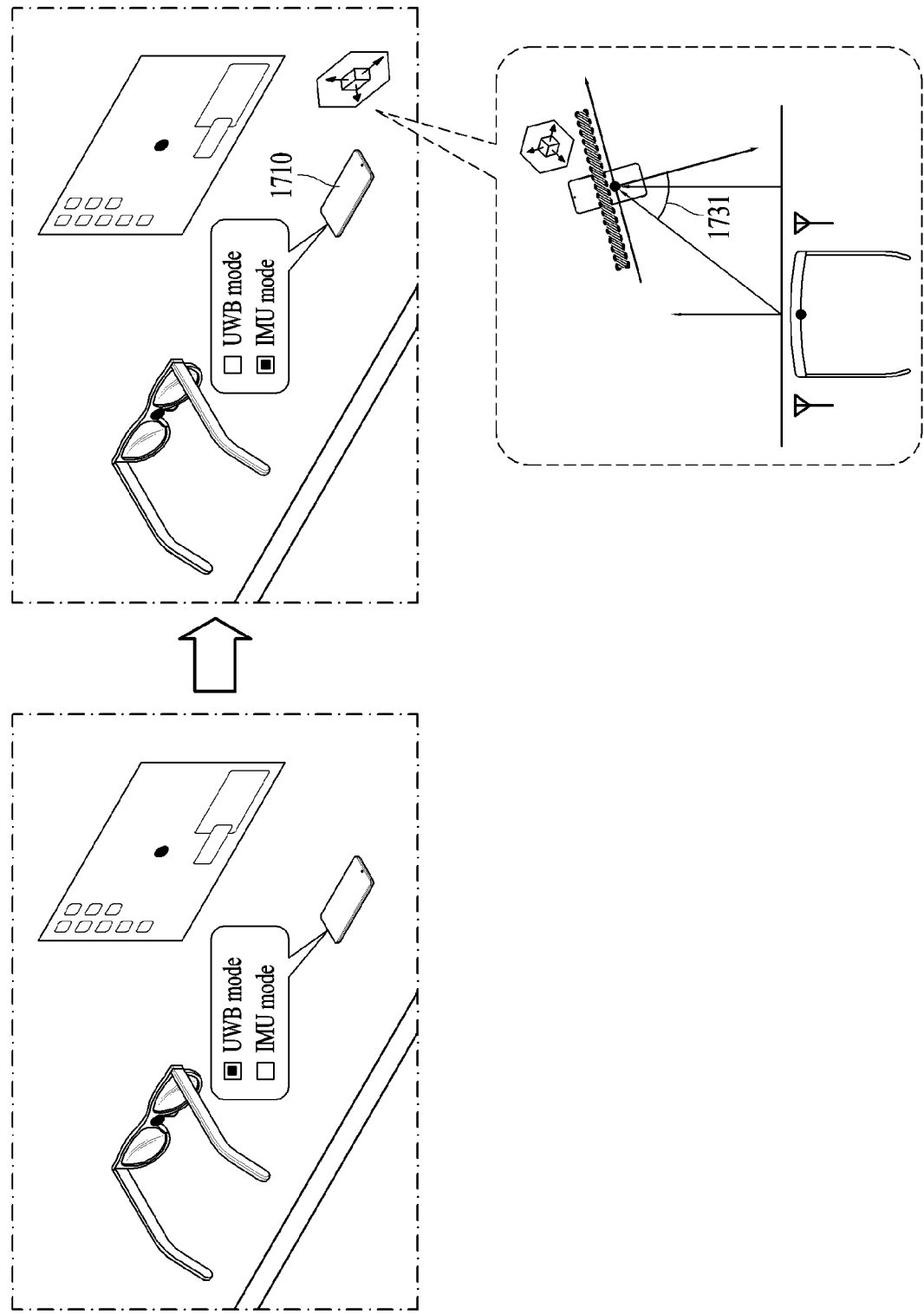
FIG. 17 is a diagram illustrating an example of rotational tracking using an inertial sensor according to an embodiment of the disclosure.
Figure 18:
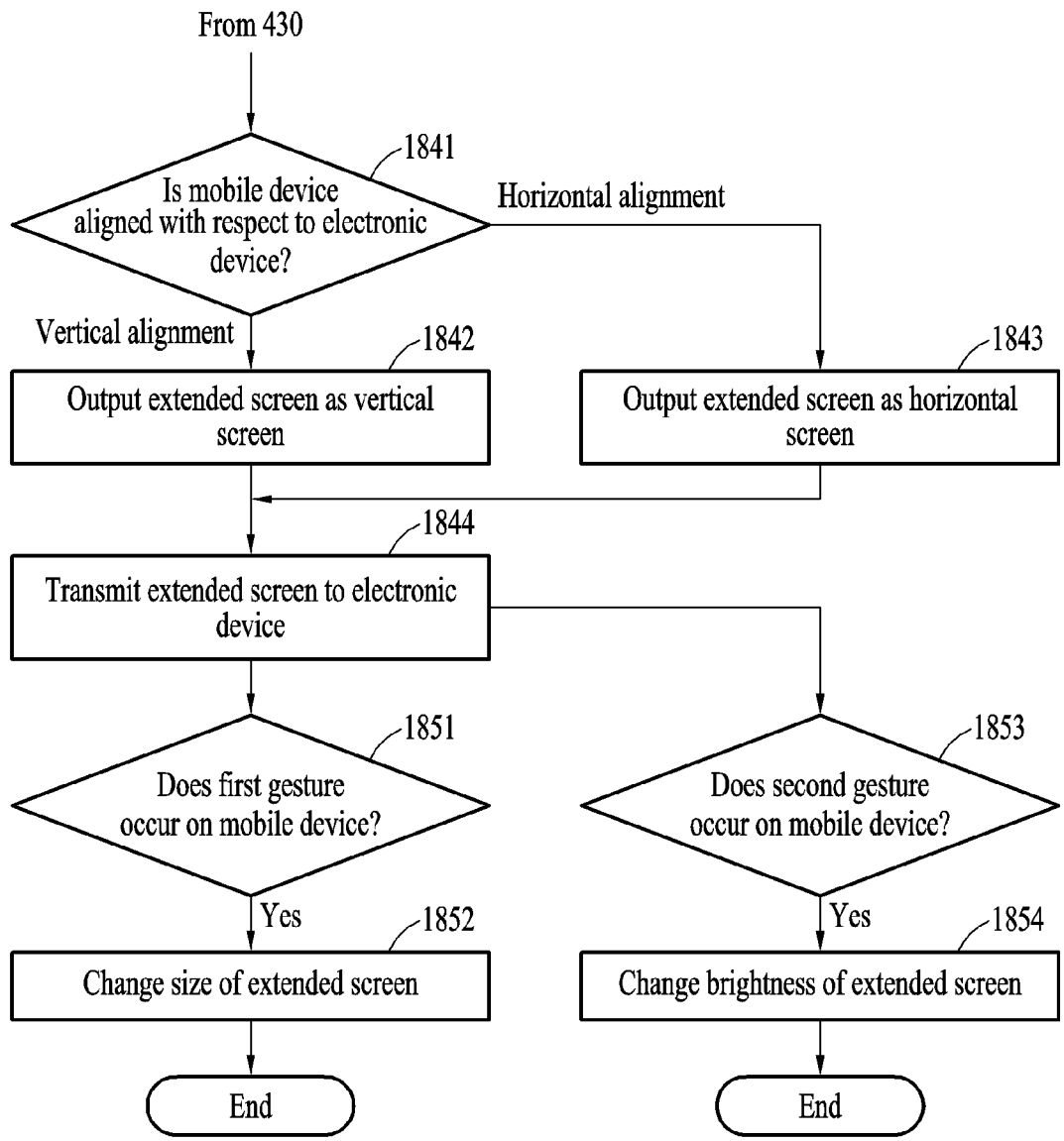
FIGS. 18, 19, 20, and 21 are diagrams illustrating an example of controlling an extended screen based on a manipulation performed on a mobile device according to various embodiments of the disclosure.

FIG. 17 is a diagram illustrating an example of rotational tracking using an inertial sensor according to an embodiment of the disclosure.

Referring to FIG. 17, when rotational detection using a wireless communication signal is not available, a processor of an electronic device 1710 may perform at least one of rotation or movement on an extended screen based on at least one of rotation information or movement information that is detected by an external device using an inertial sensor. For example, when receiving the wireless communication signal (e.g., a UWB signal) fails according to a surrounding environment, the electronic device 1710 may automatically activate a position tracking function (e.g., an inertial measurement unit (IMU) mode) using the inertial sensor of the external device, but examples are not limited thereto. In response to a manual user input, the electronic device 1710 may start performing position tracking using the inertial sensor. For example, the external device may track a change in a first angle 1731 using the inertial sensor, and transmit a variance in the tracked first angle 1731 to the electronic device 1710. The electronic device 1710 may track a variance in a second angle that is based on a rotation itself, using its inertial sensor. The electronic device 1710 may rotate the extended screen based on the first angle 1731 and second angle tracked individually using the inertial sensors.

Although the rotational tracking using the inertial sensor has been described above with reference to FIG. 17, examples are not limited thereto. The electronic device 1710 and/or the external device may also track a movement of a position of each device itself using the inertial sensor and share the tracked movement with another device.

FIGS. 18 through 21 are diagrams illustrating an example of controlling an extended screen based on a manipulation performed on a mobile device according to various embodiments of the disclosure.

In an embodiment, a processor of an electronic device may control an extended screen based on a gesture input to a mobile device.

Referring to FIGS. 18-21, in operation 1841, the electronic device may identify an alignment direction of the mobile device with respect to the electronic device. The electronic device may identify whether the mobile device is horizontally aligned or vertically aligned. The processor of the electronic device may provide the extended screen as one of a horizontal screen 2192 and a vertical screen 2191 based on the alignment between the electronic device and the mobile device. For example, when a difference in direction between a reference vector of the electronic device and a vertical axis (e.g., an axis in a longitudinal direction of the mobile device) of the mobile device is less than a threshold difference, the electronic device may determine that the mobile device is vertically aligned with respect to the electronic device. Conversely, when the difference in direction between the reference vector of the electronic device and the vertical axis of the mobile device is greater than or equal to the threshold difference, the electronic device may determine that the mobile device is horizontally aligned with respect to the electronic device. For example, as illustrated in FIG. 17, when the electronic device and the mobile device start rotational tracking based on an inertial sensor, and the mobile device is rotated by a threshold angle or greater based on a reference vector of the mobile device, the electronic device may determine that the alignment of the mobile device is changed as illustrated in 2103 in FIG. 21, for example, the horizontal alignment may be changed to the vertical alignment and the vertical alignment may be changed to the horizontal alignment.

In operation 1842, when the mobile device is vertically aligned, the electronic device may output the extended screen as the vertical screen 2191. The vertical screen 2191 may refer to a screen having a vertical length greater than a horizontal length. In operation 1843, when the mobile device is horizontally aligned, the electronic device may output the extended screen as the horizontal screen 2192. The horizontal screen 2192 may refer to a screen having a horizontal length greater than a vertical length.

Figure 21:
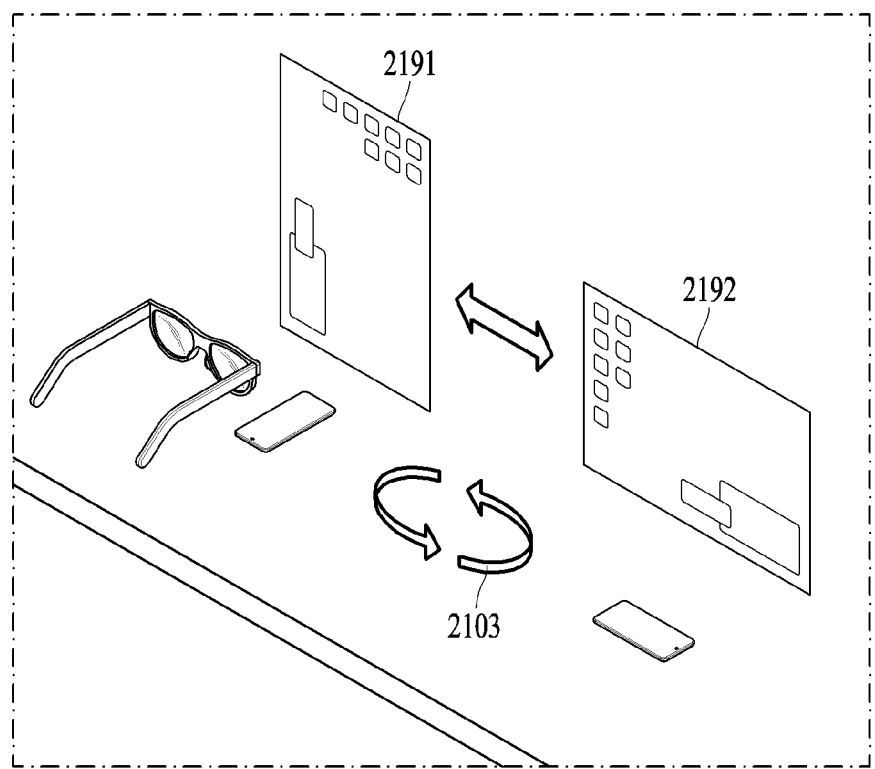

Referring to FIG. 21, the electronic device may output the extended screen as the horizontal screen 2192 when a horizontal screen is output on the mobile device, and output the extended screen as the vertical screen 2191 when a vertical screen is output on the mobile device.

In operation 1844, an external device may transmit the extended screen to the electronic device. For example, the external device may transmit, to the electronic device, the extended screen determined through operations 1841, 1842, and 1843.

In operation 1851, the electronic device may monitor whether a first gesture 1901 is performed on the mobile device. In operation 1852, when the first gesture 1901 is detected, the electronic device may change a size of the extended screen (e.g., an extended screen 1990 in FIG. 19). For example, in response to the first gesture 1901 being input to the mobile device, the processor of the electronic device may change the size of the extended screen 1990.

Figure 19:
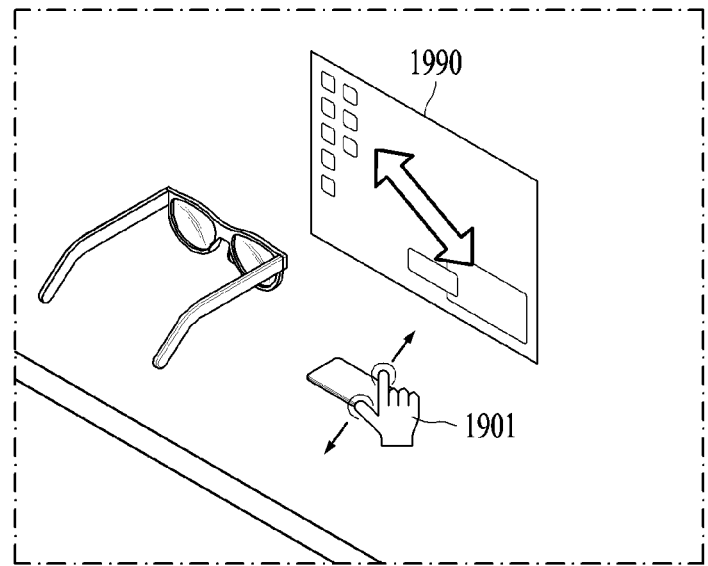

Referring to FIG. 19, the electronic device may change the size of the extended screen 1990 in response to the first gesture 1901 (e.g., pinch to zoom in and zoom out) by which a distance between two touch points on a screen of the mobile device is changed. For example, the electronic device may decrease the size of the extended screen 1990 when the distance between the two touch points decreases, and may increase the size of the extended screen 1990 when the distance between the two touch points increases.

In operation 1853, the electronic device may monitor whether a second gesture 2002 is performed on the mobile device. In operation 1854, when the second gesture 2002 is detected, the electronic device may change a brightness of the extended screen (e.g., an extended screen 2090 in FIG. 20). For example, in response to the second gesture 2002 being input to the mobile device, the processor of the electronic device may change the brightness of the extended screen 2090.

Figure 20:
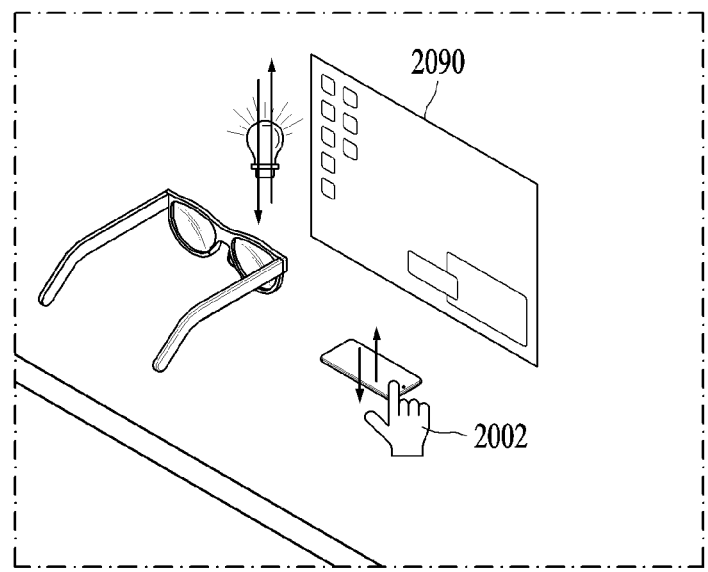

Referring to FIG. 20, the electronic device may change the brightness of the extended screen 2090 in response to a linear movement (e.g., a scroll input) along one axis of a touch input to the screen of the mobile device. For example, the electronic device may increase the brightness of the extended screen 2090 when a touch point moves along one axis in a first direction, and may decrease the brightness of the extended screen 2090 when the touch point moves in a second direction opposite to the first direction.

The mobile device may detect such gesture inputs described above by itself and request the electronic device for corresponding operations (e.g., changing the screen size and changing the brightness) in response to the gesture inputs. However, examples are not limited thereto, and these gesture inputs may be visually recognized by the electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a wireless communication circuit for wireless communication with an external device;
   an augmented reality (AR) display configured to output an extended screen of a mobile device;
   a memory configured to store therein computer-executable instructions; and
   a processor configured to access the memory and execute the stored instructions,
   wherein the instructions, when executed, cause the processor to:
      determine a reference display position in an AR environment at which the extended screen received from the mobile device is to be provided based on wireless communication with the external device, and
      when at least a portion of the extended screen to be provided at the reference display position is comprised in a field of view (FOV) area of the AR display, provide a user with the portion of the extended screen through the AR display, and
   wherein the extended screen is positioned in the AR environment at the reference display position in a plane non-parallel to a screen plane of the mobile device in the AR environment.

2. The electronic device of claim 1, wherein the stored instructions further cause the processor to:
   when the external device is the mobile device, obtain, as the reference display position, a position separated from one surface of the mobile device.

3. The electronic device of claim 2, wherein the
   plane is perpendicular to the screen plane of the mobile device.

4. The electronic device of claim 2, wherein the stored instructions further cause the processor to:
   when the mobile device is rotated on one axis perpendicular to the one surface of the mobile device, rotate a plane of the extended screen in a same direction as a rotation direction in which the mobile device rotates on the one axis.

5. The electronic device of claim 2, wherein the stored instructions further cause the processor to:
   determine the reference display position based on a gaze height of the user.

6. The electronic device of claim 1, wherein the stored instructions further cause the processor to:
   when the external device is another wireless communication device, determine, to be the reference display position, a position set by the wireless communication device based on the wireless communication device.

7. The electronic device of claim 6, wherein the stored instructions further cause the processor to:
   when the wireless communication device comprises a display, determine, to be the reference display position, a position separated by a distance determined based on a screen size of the display.

8. The electronic device of claim 6, wherein the stored instructions further cause the processor to:
   when a display of the wireless communication device is rotated on a rotation axis of the wireless communication device, rotate a plane of the extended screen in a direction different from a rotation direction in which the display is rotated on the rotation axis.

9. The electronic device of claim 1, wherein the stored instructions further cause the processor to:
when the external device moves, move the extended screen in response to a change in a position of the external device.

10. The electronic device of claim 1, wherein the wireless communication circuit comprises three or more antennas with different receiving axes.

11. The electronic device of claim 1, wherein the external device comprises a communication circuit having three or more antennas with different receiving axes.

12. The electronic device of claim 1, wherein the stored instructions further cause the processor to:
when rotational detection using a wireless communication signal is unavailable, perform at least one of rotation or movement of the extended screen based on at least one of rotation information or movement information that is detected by the external device using an inertial sensor.

13. The electronic device of claim 1, wherein the stored instructions further cause the processor to:
control the extended screen based on a gesture input to the mobile device.

14. The electronic device of claim 13, wherein the stored instructions further cause the processor to:
change a size of the extended screen in response to a first gesture input to the mobile device, and
change a brightness of the extended screen in response to a second gesture input to the mobile device.

15. The electronic device of claim 1, wherein the wireless communication circuit is configured to:
when the portion of the extended screen is not comprised in the FOV area, communicate with the external device at a first data rate, and
when the portion of the extended screen is comprised in the FOV area, communicate with the external device at a second data rate different from the first data rate.

16. The electronic device of claim 1, wherein the stored instructions further cause the processor to:
when the external device is hidden by an object between the external device and the electronic device, determine the reference display position based on a point on the object.

17. A computer-implemented method, comprising:
determining a reference display position at which an extended screen of a mobile device is to be provided in an augmented reality (AR) environment based on wireless communication with an external device; and
when at least a portion of the extended screen to be provided at the reference display position is comprised in a field of view (FOV) area of an AR display, providing a user with the portion of the extended screen through the AR display,
wherein the extended screen is positioned in the AR environment at the reference display position in a plane non-parallel to a screen plane of the mobile device in the AR environment.

18. A non-transitory computer-readable storage medium storing instructions that, when executed by a processor, cause the processor to:
determine a reference display position at which an extended screen of a mobile device is to be provided in an augmented reality (AR) environment based on wireless communication with an external device, and
when at least a portion of the extended screen to be provided at the reference display position is comprised in a field of view (FOV) area of an AR display, provide a user with the portion of the extended screen through the AR display,
wherein the extended screen is positioned in the AR environment at the reference display position in a plane non-parallel to a screen plane of the mobile device in the AR environment.

* * * * *